(12) United States Patent
Okamoto

(10) Patent No.: US 12,146,824 B2
(45) Date of Patent: Nov. 19, 2024

(54) OPTICAL MEASURING DEVICE AND OPTICAL MEASURING SYSTEM

(71) Applicant: SONY GROUP CORPORATION, Tokyo (JP)

(72) Inventor: Yoshiki Okamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 300 days.

(21) Appl. No.: 17/613,270

(22) PCT Filed: May 26, 2020

(86) PCT No.: PCT/JP2020/020793
§ 371 (c)(1),
(2) Date: Nov. 22, 2021

(87) PCT Pub. No.: WO2020/241652
PCT Pub. Date: Dec. 3, 2020

(65) Prior Publication Data
US 2022/0221391 A1   Jul. 14, 2022

(30) Foreign Application Priority Data

May 30, 2019   (JP) .................................. 2019-101735

(51) Int. Cl.
*G01N 15/14*   (2024.01)
*G01N 15/1433*   (2024.01)
(Continued)

(52) U.S. Cl.
CPC ..... *G01N 15/1434* (2013.01); *G01N 15/1433* (2024.01); *G01N 15/1459* (2013.01); *H04N 25/77* (2023.01); *G01N 2015/1445* (2013.01)

(58) Field of Classification Search
CPC ....... G01N 2021/7786; G01N 15/1434; G01N 2015/1497; G01N 2015/6428;
(Continued)

(56) References Cited

U.S. PATENT DOCUMENTS 3,916,197 A * 10/1975 Fulwyler ................ C12M 41/46
250/361 R
4,599,307 A * 7/1986 Saunders ......... G01N 33/56972
436/63

(Continued)

FOREIGN PATENT DOCUMENTS

CN   109477784 A   3/2019
EP   0543514 A2   5/1993
(Continued)

OTHER PUBLICATIONS

International Search Report and Written Opinion of PCT Application No. PCT/JP2020/020793, issued on Sep. 1, 2020, 10 pages of ISRWO.

*Primary Examiner* — Hoa Q Pham
(74) *Attorney, Agent, or Firm* — CHIP LAW GROUP

(57) ABSTRACT

There is provided an optical measuring device according to an embodiment which includes a spectroscopic optical system that spectrally disperses a fluorescent ray emitted from a specimen that passes through each of a plurality of irradiation spots arrayed in a first direction in a second direction included in a plane parallel to the first direction and an image sensor that receives the fluorescent ray spectrally dispersed by the spectroscopic optical system and generates image data. The second direction is inclined with respect to a plane vertical to the first direction.

9 Claims, 14 Drawing Sheets

(51) Int. Cl.
*G01N 15/1434* (2024.01)
*H04N 25/77* (2023.01)

(58) Field of Classification Search
CPC ... G01N 2015/6456; G01N 2015/6486; G01N 21/64; G01N 5/2256; G01N 2015/0065; H01N 5/3745
USPC .......... 356/335–343, 73, 326, 300, 311, 317, 356/319; 435/4; 436/524, 518, 172; 422/82.05, 82.07, 82.08
See application file for complete search history.

(56) References Cited

U.S. PATENT DOCUMENTS

| | | | |
|---|---|---|---|
| 5,272,354 A | 12/1993 | Kosaka | |
| 8,467,055 B2* | 6/2013 | Imanishi | G01J 3/02 356/317 |
| 10,436,697 B2* | 10/2019 | Vrane | G01N 21/49 |
| 10,883,931 B2* | 1/2021 | Nishihara | G01N 15/1459 |
| 2002/0031783 A1* | 3/2002 | Empedocles | G01N 21/272 435/7.1 |
| 2014/0339446 A1 | 11/2014 | Yamamoto et al. | |
| 2017/0328826 A1 | 11/2017 | Diebold et al. | |
| 2018/0231452 A1 | 8/2018 | Ren et al. | |
| 2019/0154850 A1 | 5/2019 | Nishihara et al. | |
| 2019/0204577 A1* | 7/2019 | Faris | G02B 21/0088 |
| 2022/0247962 A1* | 8/2022 | Maruyama | G01N 15/14 |

FOREIGN PATENT DOCUMENTS

| | | |
|---|---|---|
| EP | 2997348 A1 | 3/2016 |
| EP | 3455608 A1 | 3/2019 |
| EP | 3489723 A1 | 5/2019 |
| JP | 05-142137 A | 6/1993 |
| JP | 2007-113979 A | 5/2007 |
| JP | 2007-285999 A | 11/2007 |
| JP | 2016-524703 A | 8/2016 |
| JP | 2017-058361 A | 3/2017 |
| JP | 2018-013422 A | 1/2018 |
| JP | 2019-521316 A | 7/2019 |
| KR | 10-2019-0006164 A | 1/2019 |
| WO | 2014/186461 A1 | 11/2014 |
| WO | 2017/011549 A1 | 1/2017 |
| WO | 2017/197271 A1 | 11/2017 |
| WO | 2018/016345 A1 | 1/2018 |

* cited by examiner

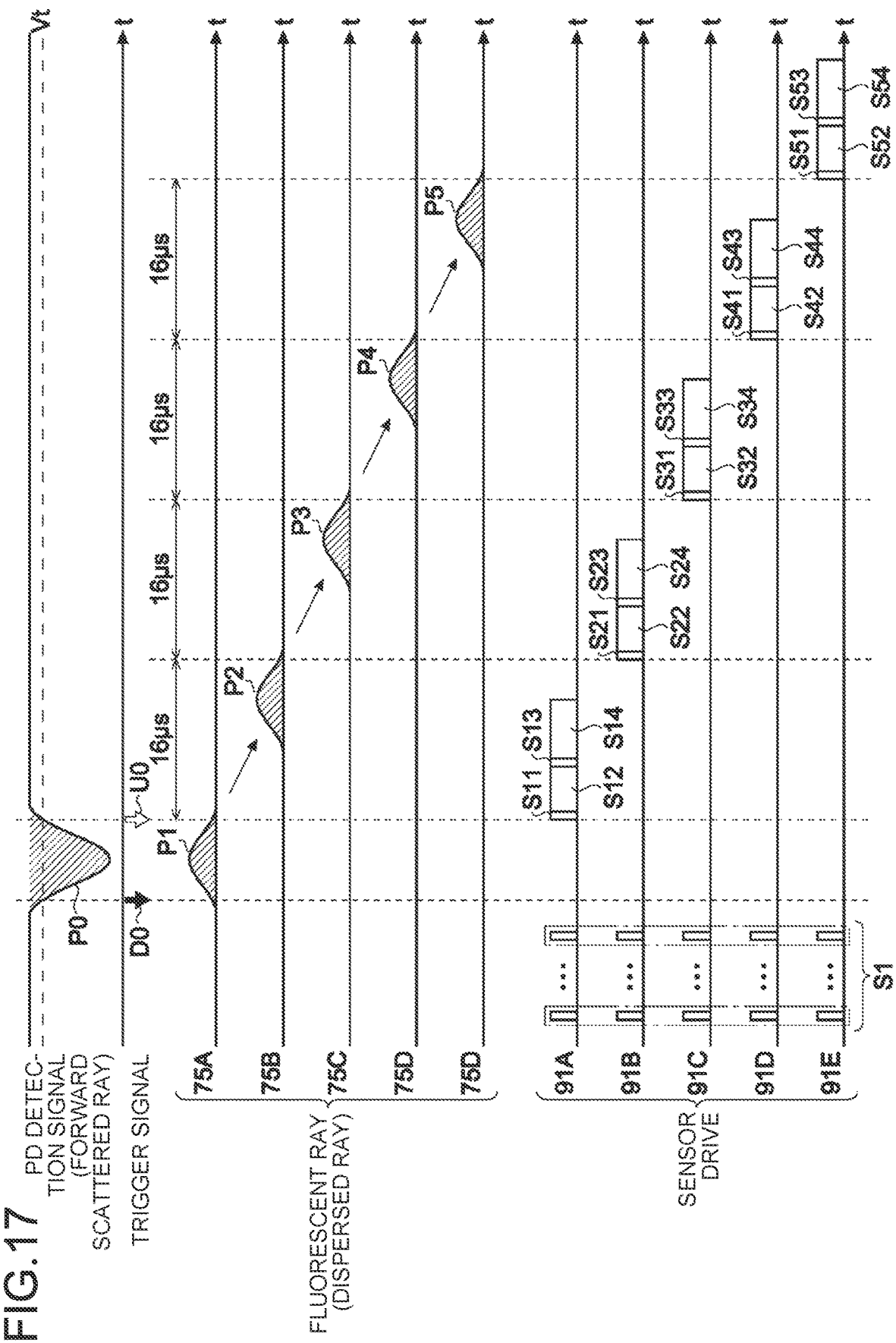

OPTICAL MEASURING DEVICE AND OPTICAL MEASURING SYSTEM

CROSS REFERENCE TO RELATED APPLICATIONS

This application is a U.S. National Phase of International Patent Application No. PCT/JP2020/020793 filed on May 26, 2020, which claims priority benefit of Japanese Patent Application No. JP 2019-101735 filed in the Japan Patent Office on May 30, 2019. Each of the above-referenced applications is hereby incorporated herein by reference in its entirety.

FIELD

The present disclosure relates to an optical measuring device and an optical measuring system.

BACKGROUND

Flow cytometry has conventionally been known as a method for analyzing proteins of biologically relevant microparticles such as cells, microorganisms, and liposomes. A device used for the flow cytometry is referred to as a flow cytometer (FCM). In the flow cytometer, microparticles flowing in a flow path in a line are irradiated with laser light having a specific wavelength, light such as a fluorescent ray, a forward scattered ray, or a side scattered ray emitted from each of the microparticles is converted into an electrical signal by a photodetector to be quantified, and a result thereof is statistically analyzed, thereby determining the type, size, structure, and the like of each of the microparticles.

In addition, in recent years, a so-called multispot type flow cytometer has been developed which emits excitation rays having different wavelengths to different positions on a flow path through which a specimen flows and observes a fluorescent ray emitted due to each of the excitation rays.

Furthermore, in recent years, a flow cytometer using an image sensor has also been developed instead of a photomultiplier.

Furthermore, in recent years, a flow cytometer capable of multicolor analysis using a plurality of fluorescent dyes has been developed on the basis of requirements of basic medicine and clinical fields. As the flow cytometer capable of multicolor analysis, a multi-channel type or spectral type flow cytometer exists. In the multi-channel type or spectral type flow cytometer, a fluorescent ray emitted from a specimen in a specific direction is spectrally dispersed by a spectroscopic optical system and is incident on an array-shaped photodetector.

CITATION LIST

Patent Literature

Patent Literature 1: JP 2017-58361 A

SUMMARY

Technical Problem

Here, in a general multispot type flow cytometer, irradiation spots irradiated with excitation rays are set at equal intervals at a plurality of locations in a linear flow path in the gravity direction. Therefore, for example, when an array direction of the irradiation spots coincides with a spectral direction of the spectroscopic optical system, dispersed rays of fluorescent rays emitted from the irradiation spots overlap each other and are incident on a photodetector. This makes accurate specimen analysis difficult disadvantageously.

On the other hand, the fluorescent rays emitted from the irradiation spots each have a beam cross-section spreading in a direction in which a specimen flows, that is, in a direction orthogonal to the array direction of the irradiation spots. Therefore, when the spectral direction of the spectroscopic optical system is set to a direction orthogonal to the array direction of the irradiation spots, a fluorescent ray is spectrally dispersed in a long axis direction of the beam cross-section. As a result, wavelength resolution is lowered, and accurate specimen analysis is difficult disadvantageously.

Therefore, the present disclosure proposes an optical measuring device and an optical measuring system that make more accurate specimen analysis possible.

Solution to Problem

To solve the above-described problem, an optical measuring device according to one aspect of the present disclosure comprises: a spectroscopic optical system that spectrally disperses a fluorescent ray emitted from a specimen that passes through each of a plurality of irradiation spots arrayed in a first direction in a second direction included in a plane parallel to the first direction; and an image sensor that receives the fluorescent ray spectrally dispersed by the spectroscopic optical system and generates image data, wherein the second direction is inclined with respect to a plane vertical to the first direction.

BRIEF DESCRIPTION OF DRAWINGS

FIG. 17 is a timing chart illustrating an example of a schematic operation of a multispot type flow cytometer according to the second embodiment.

DESCRIPTION OF EMBODIMENTS

Figure 1:
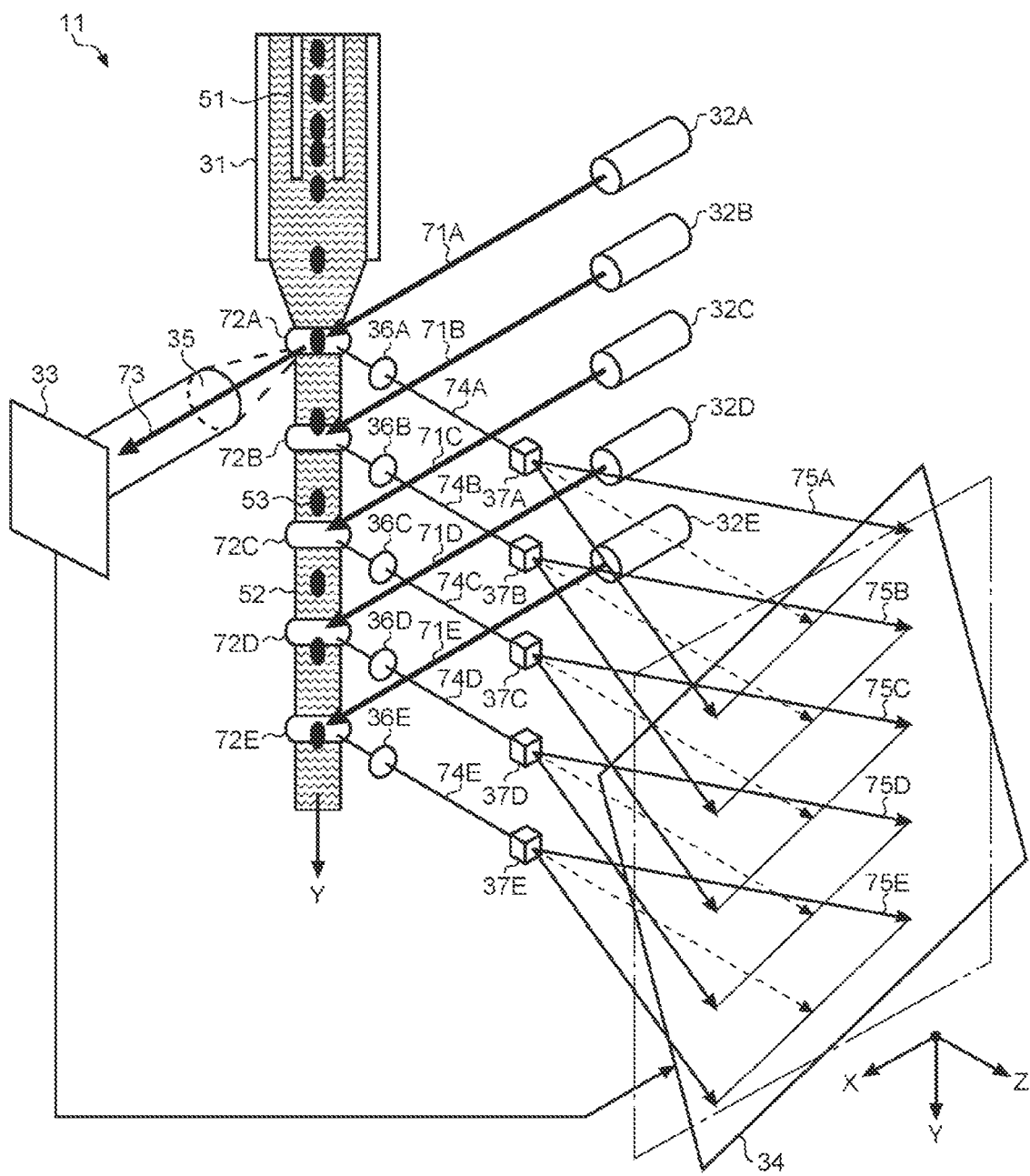
FIG. 1 is a schematic diagram illustrating an example of a schematic configuration of a flow cytometer as an optical measuring device or an optical measuring system according to a first embodiment.

Hereinafter, an embodiment of the present disclosure will be described in detail with reference to the drawings. Note that, in the following embodiments, the same parts are denoted by the same reference numerals, and redundant description will be omitted.

In addition, the present disclosure will be described according to the following item order.

1. First Embodiment
1.1 Example of schematic configuration of flow cytometer
1.2 Example of configuration of image sensor
1.3 Example of circuit configuration of pixel
1.4 Example of operation of pixel
1.4.1 Modification of pixel operation
1.5 Example of operation of pulsed light detection
1.6 Example of relationship among array direction of irradiation spots, spectral direction, and inclination of image sensor
1.7 Action and effect
2. Second Embodiment
2.1 Example of connection relationship between pixel and detection circuit
2.2 Example of circuit configuration of pixel
2.3 Example of basic operation of pixel
2.4 Example of schematic operation of flow cytometer
2.5 Action and effect 1. First Embodiment First, an optical measuring device and an optical measuring system according to a first embodiment will be described in detail with reference to the drawings. Note that a flow cytometer is classified into a cell analyzer type and a cell sorter type depending on whether or not the flow cytometer has a function of separating a specimen after examination, but a flow cytometer according to the present embodiment may be either of the cell analyzer type and the cell sorter type. In addition, when the flow cytometer is a cell sorter type, a method for supplying a specimen to an irradiation spot may be a droplet method in which liquid such as water containing a specimen is discharged in a droplet shape toward a predetermined flow path, or may be a chip method in which a chip containing a specimen is caused to flow along a predetermined flow path. In a case of the chip method, a chamber different from a chamber containing a specimen may be disposed in a chip, and the specimen may be separated into the chamber.

1.1 Example of Schematic Configuration of Flow Cytometer

Figure 2:
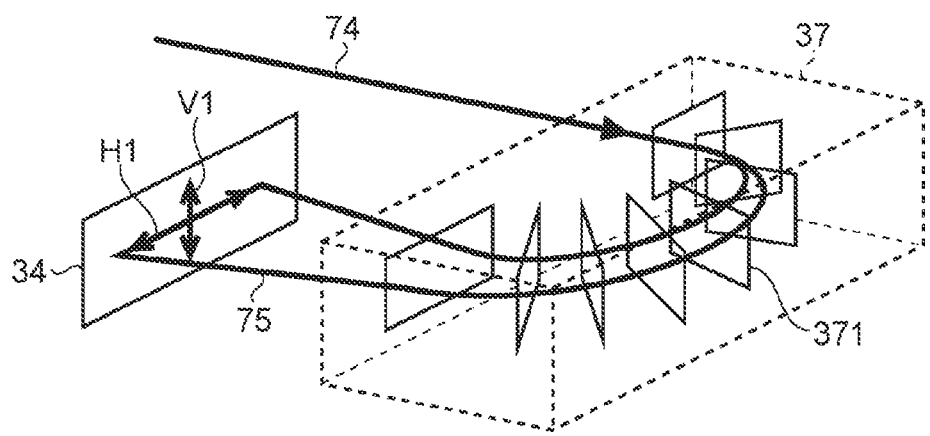
FIG. 2 is a schematic diagram illustrating an example of a spectroscopic optical system in FIG. 1.

FIG. 1 is a schematic diagram illustrating an example of a schematic configuration of a flow cytometer as the optical measuring device or the optical measuring system according to the first embodiment. FIG. 2 is a schematic diagram illustrating an example of a spectroscopic optical system in FIG. 1. Note that, in the present description, a multispot type and droplet method spectrum type flow cytometer is exemplified.

As illustrated in FIG. 1, a flow cytometer 11 includes a flow cell 31, a plurality of (five in this example) excitation light sources 32A to 32E, a photodiode 33, a plurality of spectroscopic optical systems 37A to 37E, an individual imaging element (hereinafter, referred to as an image sensor) 34, and condenser lenses 35 and 36A to 36E.

In the following description, when the excitation light sources 32A to 32E are not distinguished from each other, the excitation light sources 32A to 32E are denoted by '32'. Similarly, when the spectroscopic optical systems 37A to 37E are not distinguished from each other, the spectroscopic optical systems 37A to 37E are denoted by '37', and when the condenser lenses 36A to 36E are not distinguished from each other, the condenser lenses 36A to 36E are denoted by '36'. In addition, similarly, when excitation rays 71A to 71E described later are not distinguished from each other, the excitation rays 71A to 71E are denoted by '71', when irradiation spots 72A to 72E described later are not distinguished from each other, the irradiation spots 72A to 72E are denoted by '72', when fluorescent rays 74A to 74E described later are not distinguished from each other, the fluorescent rays 74A to 74E are denoted by '74', when dispersed rays 75A to 75E described later are not distinguished from each other, the dispersed rays 75A to 75E are denoted by '75', and when fluorescence spots 76A to 76E described later are not distinguished from each other, the fluorescence spots 76A to 76E are denoted by '76'.

The cylindrical flow cell 31 is disposed in an upper portion of the drawing, and a sample tube 51 is inserted into the cylindrical flow cell 31 substantially coaxially. The flow cell 31 is a flow path through which a specimen 53 flows, and has a structure in which a sample flow 52 flows down in a downward direction in the drawing (Y direction in the drawing), and furthermore, the specimen 53 including a cell and the like is released from the sample tube 51. The specimen 53 flows down in a line on the sample flow 52 in the flow cell 31.

In the present description, the Y direction may be, for example, a gravity direction (also referred to as a vertical direction). In this case, the sample flow 52 flowing out of the flow cell 31 falls in the Y direction according to gravity. In addition, in the drawing, the Y direction and an X direction may be orthogonal to each other in a vertical plane. Meanwhile, the Y direction and the X direction may be orthogonal to each other in a horizontal plane, and the Y direction and a Z direction may be orthogonal to each other in a horizontal plane.

The excitation light sources 32A to 32E are, for example, laser light sources that emit excitation rays 71A to 71E each having a single wavelength, respectively, and irradiate the irradiation spots 72A to 72E set, for example, at equal intervals on a flow path through which the specimen 53 passes with the excitation rays 71A to 71E, respectively. For example, each excitation ray 71 may be incident on each irradiation spot 72 from the X direction. Each of the excitation rays 71A to 71E may be continuous light or pulsed light having a long time width to some extent.

When the specimen 53 is irradiated with the excitation ray 71 at the irradiation spot 72, the excitation ray 71 is scattered by the specimen 53, and the specimen 53, a fluorescent marker attached thereto, or the like is excited.

In the present description, a component directed in a direction opposite to the excitation light source 32 across the irradiation spot 72 among scattered rays scattered by the specimen 53 is referred to as a forward scattered ray. A forward scattered ray 73 in FIG. 1 is a forward scattered ray of the excitation ray 71A.

The scattered ray also includes a component directed in a direction deviated from a straight line connecting the excitation light source 32 and the irradiation spot 72, and a component directed from the irradiation spot 72 to the excitation light source 32. In the present description, among the scattered rays, a component directed in a predetermined direction deviated from a straight line connecting the excitation light source 32 and the irradiation spot 72 (Z direction in the drawing, hereinafter, referred to as a side direction) is referred to as a side scattered ray, and a component directed from the irradiation spot 72 to the excitation light source 32 is referred to as a back scattered ray.

In addition, when the excited specimen 53, the fluorescent marker, and the like are de-excited, fluorescent rays each having a wavelength unique to atoms and molecules constituting the excited specimen 53, the fluorescent marker, and the like are emitted from the excited specimen 53, the fluorescent marker, and the like. The fluorescent rays are emitted from the specimen 53, the fluorescent marker, and the like in all directions. However, in the configuration illustrated in FIG. 1, among these fluorescent rays, a component emitted from the irradiation spot 72 in a specific direction (side direction) is defined as the fluorescent ray 74 to be analyzed. Note that the light emitted from the irradiation spot 72 in the side direction includes a side scattered ray and the like in addition to the fluorescent ray. However, in the following, light components and the like other than the fluorescent ray 74 are appropriately omitted for simplification of description.

The forward scattered ray 73 that has passed through the irradiation spot 72A located on a most upstream side in the sample flow 52 is converted into parallel light by the condenser lens 35, and then incident on the photodiode 33 disposed on the opposite side to the excitation light source 32A across the irradiation spot 72A. Meanwhile, the fluorescent ray 74A emitted from the specimen 53 at the irradiation spot 72A is converted into parallel light by the condenser lens 36A and then incident on the spectroscopic optical system 37A.

Similarly, the fluorescent rays 74B to 74E emitted from the irradiation spots 72B to 72E are converted into parallel light by the condenser lenses 36B to 36E, and then incident on the spectroscopic optical systems 37B to 37E, respectively.

Each of the condenser lenses 35 and 36 may include another optical element such as a filter that absorbs light having a specific wavelength or a prism that changes a traveling direction of light. For example, the condenser lens 36 may include an optical filter that reduces the side scattered ray out of the incident side scattered ray and the fluorescent ray 74.

As illustrated in FIG. 2, the spectroscopic optical system 37 includes, for example, one or more optical elements 371 such as a prism and a diffraction grating, and spectrally disperses the incident fluorescent ray 74 into the dispersed rays 75 emitted at different angles depending on a wavelength. A direction in which the fluorescent ray 74 spreads by the spectroscopic optical system 37, that is, a spectral direction, an array direction of the irradiation spots 72A to 72E, and an inclination of the image sensor 34 (for example, an inclination of a column direction V1 of the image sensor 34 with respect to the spectral direction) will be described in detail later.

The dispersed rays 75 emitted from the spectroscopic optical systems 37 are incident on different regions on a light receiving surface of the image sensor 34. Therefore, the dispersed rays 75 having different wavelengths depending on a position in a direction H1 are incident on the image sensor 34.

Here, while the forward scattered ray 73 is light having a large light amount, the side scattered ray and the fluorescent ray 74A are weak pulsed light generated when the specimen 53 passes through the irradiation spot 72A. Therefore, in the present embodiment, the forward scattered ray 73 is observed by the photodiode 33, and a timing when the specimen 53 passes through the irradiation spot 72A located on a most upstream side in the sample flow 52 is thereby detected.

For example, the photodiode 33 observes the forward scattered ray 73 emitted from the irradiation spot 72A all the time. In this state, when the light amount detected by passage of the specimen 53 temporarily decreases, the photodiode 33 generates a trigger signal indicating passage of the specimen 53 at a timing when the light amount decreases, and inputs the trigger signal to the image sensor 34.

The image sensor 34 is, for example, an imaging element including a plurality of pixels in which an analog to digital (AD) converter is built in the same semiconductor chip. Each pixel includes a photoelectric conversion element and an amplification element, and photoelectrically converted charges are accumulated in the pixel. A signal reflecting an accumulated charge amount (pixel signal, also referred to as a pixel value) is amplified and output via an amplifying element at a desired timing, and converted into a digital signal by the built-in AD converter.

Note that, in the present description, the case where the forward scattered ray 73 is used for generating the trigger signal has been exemplified. However, the present disclosure is not limited thereto, and for example, the trigger signal may be generated using the side scattered ray, the back scattered ray, the fluorescent ray 74, or the like.

1.2 Example of Configuration of Image Sensor

Figure 3:
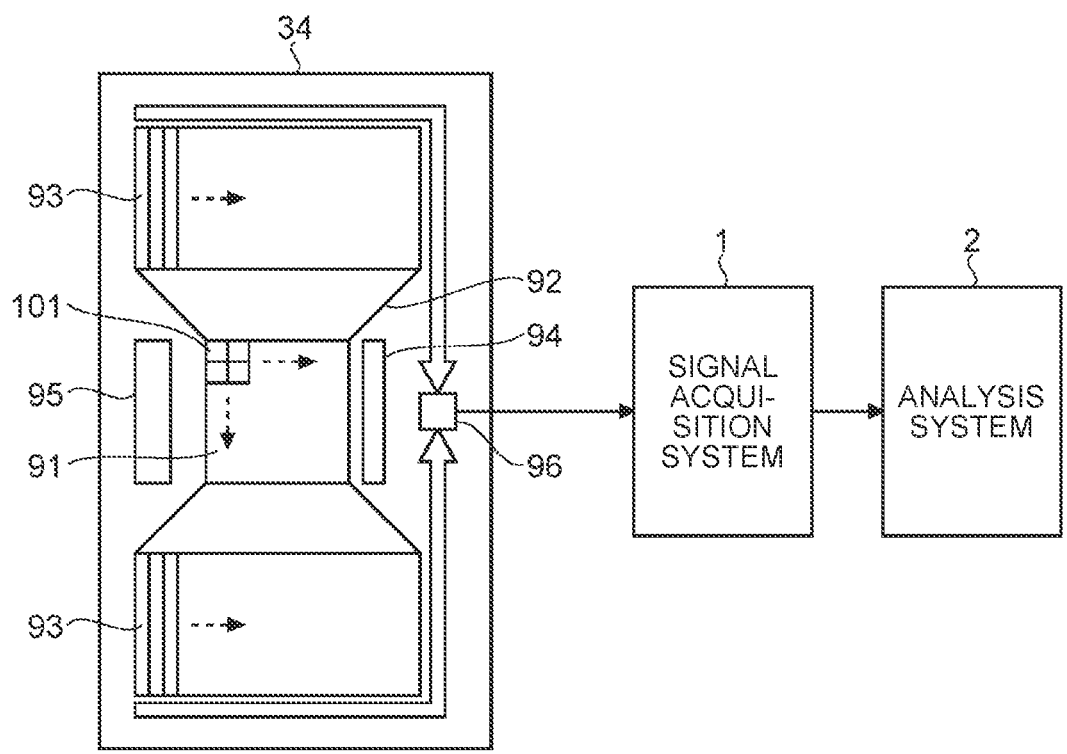
FIG. 3 is a block diagram illustrating an example of a schematic configuration of an image sensor according to the first embodiment.
Figure 4:
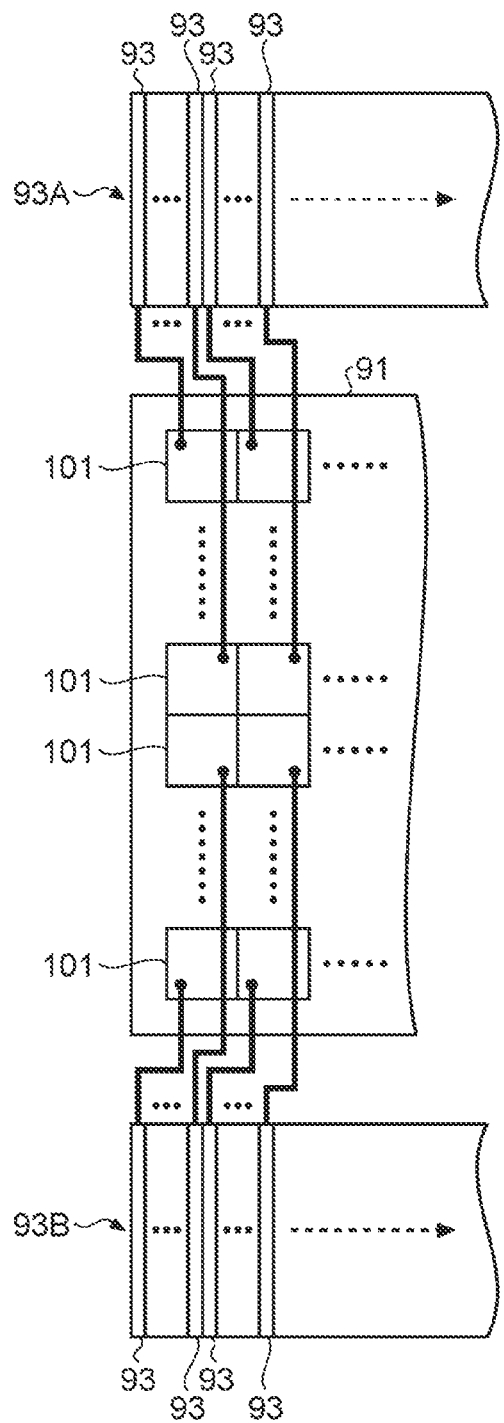
FIG. 4 is a diagram illustrating an example of a connection relationship between a pixel and a detection circuit in FIG. 3.

Next, the image sensor 34 according to the first embodiment will be described. FIG. 3 is a block diagram illustrating an example of a schematic configuration of a complementary metal-oxide-semiconductor (CMOS) type image sensor according to the first embodiment. FIG. 4 is a diagram illustrating an example of a connection relationship between a pixel and a detection circuit in FIG. 3.

Here, the CMOS type image sensor is a solid-state imaging element (also referred to as a solid-state imaging device) formed by applying or partially using a CMOS process. The image sensor 34 according to the first embodiment may be a so-called back surface irradiation type in which an incident surface is on a side opposite to an element formation surface (hereinafter, referred to as a back surface) in a semiconductor substrate, or may be of a so-called front surface irradiation type in which the incident surface is on a front surface side. Note that the size, the number, the number of rows, the number of columns, and the like exemplified in the following description are merely examples, and can be variously changed.

As illustrated in FIG. 3, the image sensor 34 includes a pixel array unit 91, a connection unit 92, a detection circuit 93, a pixel drive circuit 94, a logic circuit 95, and output circuit 96.

The pixel array unit 91 includes, for example, a plurality of pixels 101 arrayed in a matrix (also referred to as a two-dimensional matrix). As described later, each pixel 101 includes a photoelectric conversion element (corresponding to a photodiode 111 described later) that photoelectrically converts incident light to generate a charge. Light incident surfaces of the photoelectric conversion elements in the pixels 101 are arrayed in a matrix on a light receiving surface of the pixel array unit 91.

The pixel drive circuit 94 drives each pixel 101 to cause each pixel 101 to generate a pixel signal. The logic circuit 95 controls drive timings of the detection circuit 93 and the output circuit 96 in addition to the pixel drive circuit 94. In addition, the logic circuit 95 and/or the pixel drive circuit 94 also functions as a control unit that controls readout of a pixel signal with respect to the pixel array unit 91 in accordance with passage of the specimen 53 through the irradiation spot 72.

Note that the image sensor 34 may further include an amplifier circuit such as an operational amplifier that amplifies a pixel signal before AD conversion.

The fluorescent rays 74A to 74E emitted from the irradiation spots 72A to 72E in a side direction are collimated by the condenser lenses 36A to 36E, and then converted into the dispersed rays 75A to 75E by the spectroscopic optical systems 37A to 37E, respectively. Then, the dispersed rays 75A to 75E are incident on different regions on a light receiving surface on which the pixels 101 of the pixel array unit 91 are arrayed.

To each pixel 101 of the pixel array unit 91, among the dispersed rays 75, a wavelength component determined by a position in the row direction H1 in the pixel array unit 91 is input. For example, in the positional relationship exemplified in FIG. 2, in the image sensor 34 in FIG. 2, light having a shorter wavelength is incident on a pixel 101 located on a more right side, and light having a longer wavelength is incident on a pixel 101 located on a more left side.

Each pixel 101 generates a pixel signal corresponding to an emitted light amount. The generated pixel signal is read out by, for example, the detection circuit 93 disposed on a one-to-one basis with respect to the pixel 101. Each detection circuit 93 includes an AD converter, and converts the analog pixel signal that has been read out into a digital pixel signal.

Here, as illustrated in FIG. 4, for example, the plurality of detection circuits 93 may be arrayed so as to be divided into two groups (detection circuit arrays 93A and 93B) with respect to the pixel array unit 91. One detection circuit array 93A is disposed, for example, on an upper side of the pixel array unit 91 in a column direction, and the other detection circuit array 93B is disposed, for example, on a lower side of the pixel array unit 91 in the column direction. In each of the detection circuit arrays 93A and 93B, the plurality of detection circuits 93 is arrayed in one row or a plurality of rows in a row direction.

For example, the detection circuits 93 of the detection circuit array 93A disposed on an upper side of the pixel array unit 91 in the column direction may be connected to the pixels 101 in an upper half of the pixel array unit 91 in the column direction, and the detection circuits 93 of the detection circuit array 93B disposed on a lower side in the column direction may be connected to the pixels 101 in a lower half of the pixel array unit 91 in the column direction. However, the present disclosure is not limited thereto, and various modifications may be made, for example, the detection circuits 93 of the detection circuit array 93A may be connected to the pixels 101 in even number columns, and the detection circuits 93 of the detection circuit array 93B may be connected to the pixels 101 in odd number columns. In addition, for example, the plurality of detection circuits 93 may be arrayed in one row or a plurality of rows on one side (for example, an upper side in the column direction) of the pixel array unit 91.

In the present embodiment, it is assumed that a so-called global shutter method that executes readout operations for all the pixels 101 simultaneously in parallel is adopted for the image sensor 34. In the global shutter method, each pixel 101 of the pixel array unit 91 is connected to the detection circuit 93 on a one-to-one basis. In this case, for example, if 100 pixels 101 are arrayed in the column direction V1 in the pixel array unit 91, it is necessary to arrange 100 detection circuits 93 for one column of pixels.

Therefore, as described above, when the detection circuits 93 are classified into two groups of the detection circuit arrays 93A and 93B and the number of rows of each of the groups is set to one, for 100 pixels 101 arranged in one column, it is only required to arrange 50 detection circuits 93 in each of the detection circuit arrays 93A and 93B.

Description will be made with reference to FIG. 3 again. A pixel signal read out from each pixel 101 by the detection circuit 93 is converted into a digital pixel signal by the AD converter of each detection circuit 93. Then, the digital pixel signal is output as image data for one frame (corresponding to fluorescence spectrum information, hereinafter, referred to as a spectral image) to an external signal acquisition system 1 via the output circuit 96.

For example, the signal acquisition system (also referred to as a signal acquisition unit) 1 evaluates a spectral image input from the image sensor 34, and inputs an evaluation value as a result thereof to an analysis system 2. For example, the signal acquisition system 1 divides a spectral image into a plurality of regions (corresponding to channel regions described later) arrayed in the row direction H1, and adds up pixel values of pixels included in the regions to calculate an evaluation value of the spectral image (corresponding to multi-channel analysis described later). In addition, the signal acquisition system 1 may have a so-called virtual filter function of adding up pixel values of pixels included in one or more regions (corresponding to a virtual filter described later) set in advance or arbitrarily set by a user to calculate an evaluation value of a spectral image.

Such a signal acquisition system 1 may be a digital signal processor (DSP), a field-programmable gate array (FPGA), or the like disposed in the same chip as or outside the image sensor 34, or may be an information processing device such as a personal computer connected to the image sensor 34 via a bus or a network.

The analysis system (also referred to as an analysis unit) 2 executes various analysis processes on the basis of an evaluation value input from the signal acquisition system 1. For example, the analysis system 2 acquires information such as the type, size, and structure of the specimen 53 on the basis of the evaluation value. In addition, the analysis system 2 may display a spectral image and an evaluation value to a user and may also provide a user interface (UI) serving as an analysis tool. Such an analysis system 2 may be, for example, an information processing device such as a personal computer connected to the signal acquisition system 1 via a bus or a network.

1.3 Example of Circuit Configuration of Pixel

Figure 5:
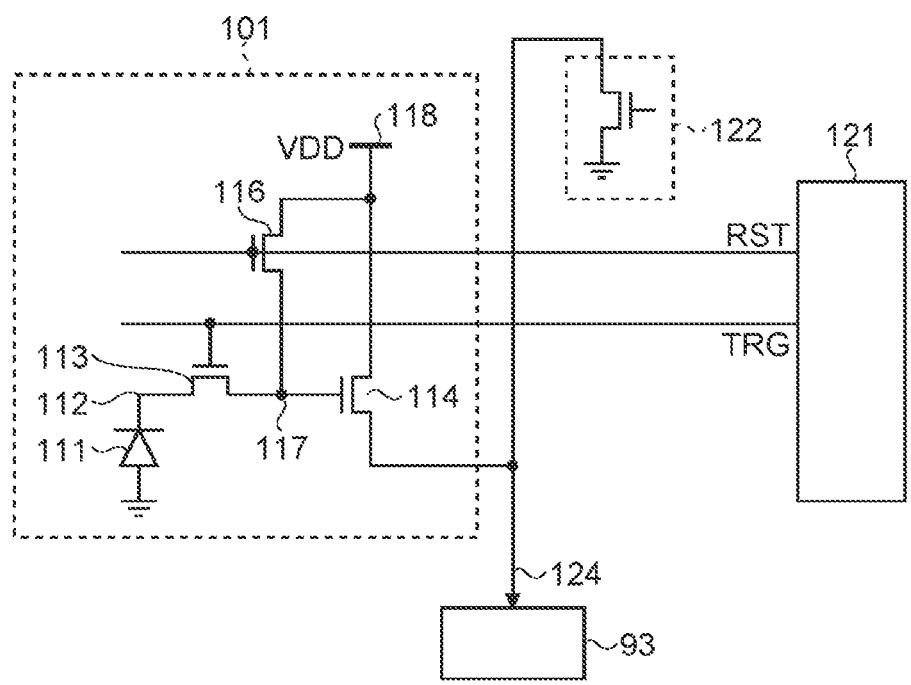
FIG. 5 is a circuit diagram illustrating an example of a circuit configuration of a pixel according to the first embodiment.

Next, an example of a circuit configuration of the pixel 101 according to the first embodiment will be described with reference to FIG. 5. FIG. 5 is a circuit diagram illustrating an example of a circuit configuration of a pixel according to the first embodiment.

As illustrated in FIG. 5, the pixel 101 includes a photodiode (also referred to as a photoelectric conversion element) 111, an accumulation node 112, a transfer transistor 113, an amplification transistor 114, a selection transistor 115, a reset transistor 116, and a floating diffusion (FD) 117. For example, an N-type metal-oxide-semiconductor (MOS) transistor may be used for each of the transfer transistor 113, the amplification transistor 114, the selection transistor 115, and the reset transistor 116.

A circuit including the photodiode 111, the transfer transistor 113, the amplification transistor 114, the selection transistor 115, the reset transistor 116, and the floating diffusion 117 is also referred to as a pixel circuit. In addition, a configuration of the pixel circuit excluding the photodiode 111 is also referred to as a readout circuit.

The photodiode 111 converts a photon into a charge by photoelectric conversion. The photodiode 111 is connected to the transfer transistor 113 via the accumulation node 112. The photodiode 111 generates a pair of an electron and a hole from a photon incident on a semiconductor substrate on which the photodiode 111 itself is formed, and accumulates the electron in the accumulation node 112 corresponding to a cathode. The photodiode 111 may be a so-called embedded type in which the accumulation node 112 is completely depleted at the time of charge discharge by resetting.

The transfer transistor 113 transfers a charge from the accumulation node 112 to the floating diffusion 117 under control of a row drive circuit 121. The floating diffusion 117 accumulates charges from the transfer transistor 113 and generates a voltage having a voltage value corresponding to the amount of the accumulated charges. This voltage is applied to a gate of the amplification transistor 114.

The reset transistor 116 releases the charges accumulated in the accumulation node 112 and the floating diffusion 117 to a power supply 118 and initializes the charge amounts of the accumulation node 112 and the floating diffusion 117. A gate of the reset transistor 116 is connected to the row drive circuit 121, a drain of the reset transistor 116 is connected to the power supply 118, and a source of the reset transistor 116 is connected to the floating diffusion 117.

For example, the row drive circuit 121 controls the reset transistor 116 and the transfer transistor 113 to be in an ON state to extract electrons accumulated in the accumulation node 112 to the power supply 118, and initializes the pixel 101 to a dark state before accumulation, that is, a state in which light is not incident. In addition, the row drive circuit 121 controls only the reset transistor 116 to be in an ON state to extract charges accumulated in the floating diffusion 117 to the power supply 118, and initializes the charge amount of the floating diffusion 117.

The amplification transistor 114 amplifies a voltage applied to the gate and causes the voltage to appear at a drain. The gate of the amplification transistor 114 is connected to the floating diffusion 117, a source of the amplification transistor 114 is connected to a power supply, and the drain of the amplification transistor 114 is connected to a source of the selection transistor 115.

A gate of the selection transistor 115 is connected to the row drive circuit 121, and a drain of the selection transistor 115 is connected to a vertical signal line 124. The selection transistor 115 causes the voltage appearing in the drain of the amplification transistor 114 to appear in the vertical signal line 124 under control of the row drive circuit 121.

The amplification transistor 114 and a constant current circuit 122 form a source follower circuit. The amplification transistor 114 amplifies a voltage of the floating diffusion 117 with a gain of less than 1, and causes the voltage to appear in the vertical signal line 124 via the selection transistor 115. The voltage appearing in the vertical signal line 124 is read out as a pixel signal by the detection circuit 93 including an AD conversion circuit.

The pixel 101 having the above configuration accumulates charges generated by photoelectric conversion therein during a period from a time when the photodiode 111 is reset till a time when the pixel signal is read out. Then, when the pixel signal is read out, the pixel 101 causes a pixel signal corresponding to accumulated charges to appear in the vertical signal line 124.

Note that the row drive circuit 121 in FIG. 5 may be, for example, a part of the pixel drive circuit 94 in FIG. 3, and the detection circuit 93 and the constant current circuit 122 may be, for example, a part of the detection circuit 93 in FIG. 3.

1.4 Example of Operation of Pixel

Figure 6:
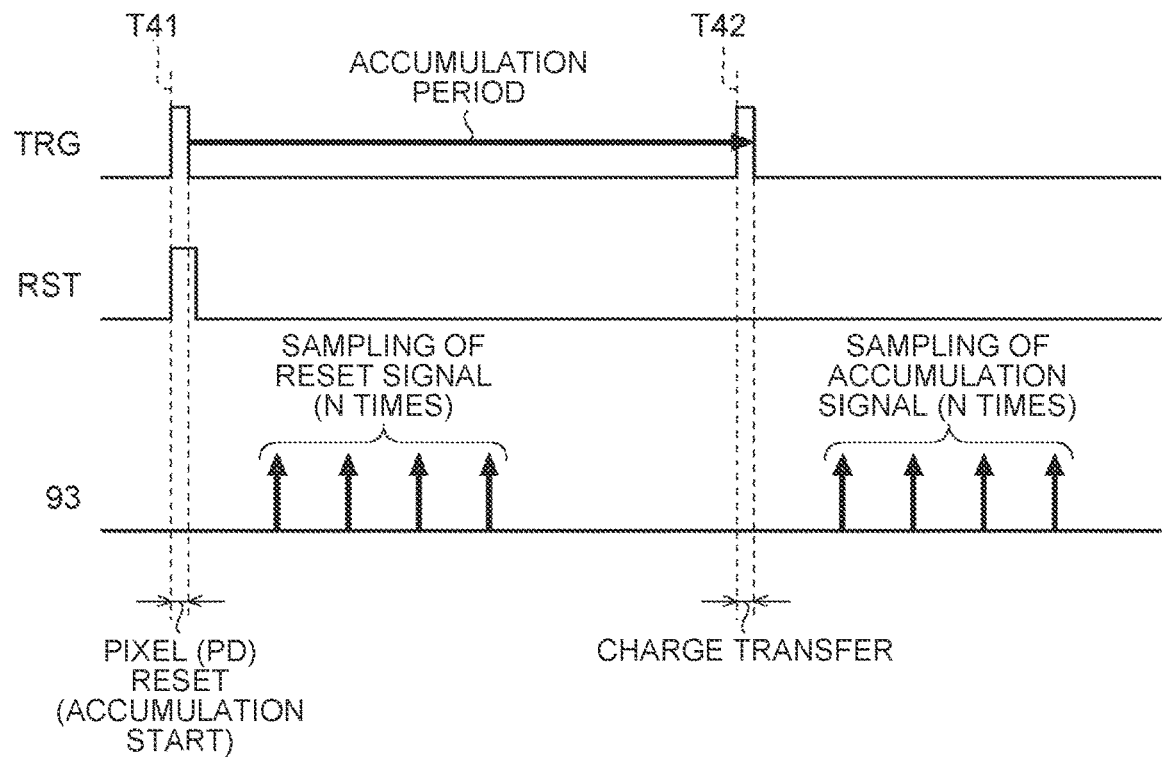
FIG. 6 is a timing chart illustrating an example of an operation of the pixel according to the first embodiment.

Next, an example of an operation of the pixel 101 according to the first embodiment will be described with reference to a timing chart of FIG. 6. FIG. 6 is a timing chart illustrating an example of an operation of a pixel according to the first embodiment.

As illustrated in FIG. 6, at timing T41, the row drive circuit 121 raises a transfer signal TRG to be applied to the gate of the transfer transistor 113 and a reset signal RST to be applied to the gate of the reset transistor 116 to a high level at a timing immediately before an accumulation period. As a result, both the transfer transistor 113 and the reset transistor 116 are put into an ON state, and charges accumulated in the accumulation node 112 between the photodiode 111 and the transfer transistor 113 are discharged to the power supply 118. Hereinafter, this control is referred to as "PD reset".

In addition, when the reset transistor 116 is put into an ON state, the floating diffusion 117 is also connected to the power supply 118 via the reset transistor 116, and therefore charges accumulated in the floating diffusion 117 are also discharged to the power supply 118.

Thereafter, the row drive circuit 121 causes the transfer signal TRG to fall to a low level to control the transfer transistor 113 to be in an OFF state. By this control, the accumulation node 112 is put into a floating state, and a new accumulation period starts.

In addition, the row drive circuit 121 sets the transfer transistor 113 to be in an OFF state and then causes the reset signal RST to fall to a low level to control the reset transistor 116 to be in an OFF state. By this control, the potential of the floating diffusion 117 is somewhat lowered from a reference potential due to coupling with the gate of the reset transistor 116, and is put into a floating state. This control is hereinafter referred to as "FD reset".

As described above, in the present example of an operation, the PD reset and the FD reset are continuously performed.

After the FD reset is executed, the voltage of the floating diffusion 117 in a reset state is amplified by the amplification transistor 114 and appears in the vertical signal line 124.

The detection circuit 93 performs signal readout (hereinafter, referred to as sampling) one or more times (for example, four times) during one exposure period. In the sampling, the potential appearing in the vertical signal line 124 is read out by the detection circuit 93 as a signal in a state where the pixel 101 is reset (hereinafter, referred to as a reset signal), and converted into a digital signal. Multiple sampling of the reset signal is handled as first readout in correlated double sampling (CDS) described later.

Then, at timing T42, the row drive circuit 121 raises the transfer signal TRG to a high level immediately before the accumulation period ends, and controls the transfer transistor 113 to be in an ON state. By this control, charges accumulated in the accumulation node 112 are transferred to the floating diffusion 117. At this time, if the potential of the floating diffusion 117 is sufficiently deep, all electrons accumulated in the accumulation node 112 are transferred to the floating diffusion 117, and the accumulation node 112 is put into a completely depleted state.

In addition, when a predetermined pulse period has elapsed from timing T42, the row drive circuit 121 causes the transfer signal TRG to fall and controls the transfer transistor 113 to be in an OFF state. By this control, the potential of the floating diffusion 117 is lowered by the accumulated charge amount as compared with that before the transfer transistor 113 is driven (that is, the potential becomes shallower).

As described above, when the charges accumulated in the accumulation node 112 are transferred to the floating diffusion 117, the voltage corresponding to the decrease is amplified by the amplification transistor 114 and appears in the vertical signal line 124.

Similarly to the sampling of the reset signal, the detection circuit 93 samples the potential appearing in the vertical signal line 124 once or more times (for example, four times). In the sampling, the potential appearing in the vertical signal line 124 is read out by the detection circuit 93 as an accumulation signal of a voltage value corresponding to an incident photon amount and converted into a digital signal. The multiple sampling of the accumulation signal is handled as second readout in CDS.

The detection circuit 93 compares the sampled accumulation signal with the reset signal, and determines the incident photon amount on the basis of the comparison result.

For example, the detection circuit 93 adds all the plurality of accumulation signals and calculates an average value of the accumulation signals as necessary. Similarly, the detection circuit 93 adds all the plurality of reset signals and calculates an average value of the reset signals as necessary.

Then, the detection circuit 93 executes CDS that calculates a difference between an addition value (or an average value) of the accumulation signals and an addition value (or an average value) of the reset signals. By this CDS, kTC noise generated at the time of FD reset is canceled out, and a net pixel signal based on the light amount of the fluorescent ray 74 is determined.

The accumulation period of each pixel (pixel circuit) 101 is a period between the PD reset operation and the accumulation signal readout operation described above, and to be precise, a period from a time when the transfer signal TRG falls at the time of PD reset till a time when the transfer signal TRG falls again at the time of charge transfer. When a photon is incident on the photodiode 111 and a charge is generated during this accumulation period, the charge serves as a difference between the reset signal and the accumulation signal, and is acquired by the detection circuit 93 as the net pixel signal.

Note that, in the detection circuit 93, by performing CDS between digital values that have passed through the AD converter, noise mixed in an AD conversion process can also be canceled out.

1.4.1 Modification of Pixel Operation

By the way, in the example of an operation using FIG. 6, a dead period in which accumulation is not performed is generated after a unit accumulation is completed and before a next accumulation starts, particularly, during a sampling period of the accumulation signal. Therefore, in particular, in order to cope with high-speed sampling, such a dead period may be removed.

Figure 7:
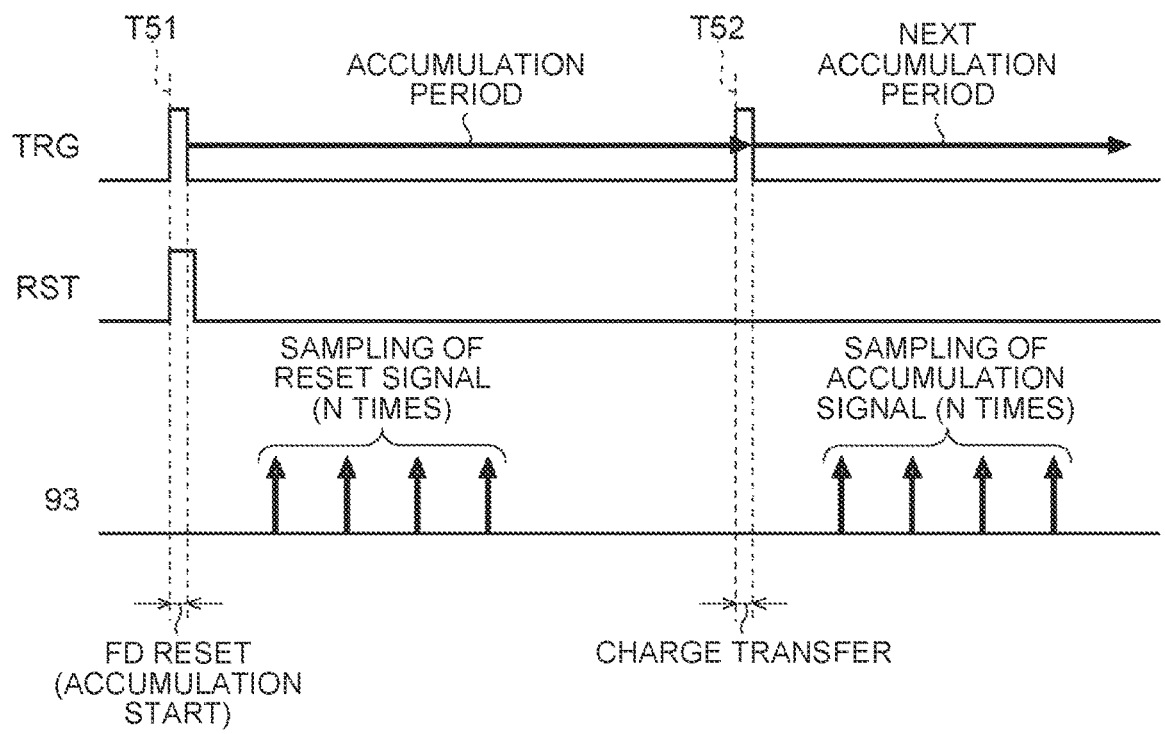
FIG. 7 is a timing chart illustrating an example of an operation of a pixel according to a modification of the first embodiment.

FIG. 7 is a timing chart illustrating an example of an operation of a pixel according to a modification. In the example of FIG. 7, PD reset at timing T41 performed in FIG. 6 is omitted, and charge discharge of the photodiode 111 accompanying charge transfer at timing T42, which is a time of readout, is also used as the PD reset.

That is, at timing T51 corresponding to timing T41 in FIG. 6, only FD reset is performed, and subsequently, sampling at a reset level is performed. At this time, the transfer signal TRG remains at a low level, and accumulated charges of the photodiode 111 are held as they are.

Then, at timing T52, the transfer signal TRG is raised to a high level, and charges of the accumulation node 112 are transferred to the floating diffusion 117, but this charge transfer is also used as the PD reset. In this case, a next accumulation period of the photodiode 111 starts immediately after the charge transfer is completed, that is, when the transfer signal TRG falls. As a result, the dead period during which no photon incident on the pixel 101 is detected is substantially zero.

Note that, in each of the examples of an operation in FIGS. 6 and 7, the shortest cycle of the unit accumulation can be defined by a total required time of sampling of the reset signal and sampling of the accumulation signal.

1.5 Example of Operation of Pulsed Light Detection

Figure 8:
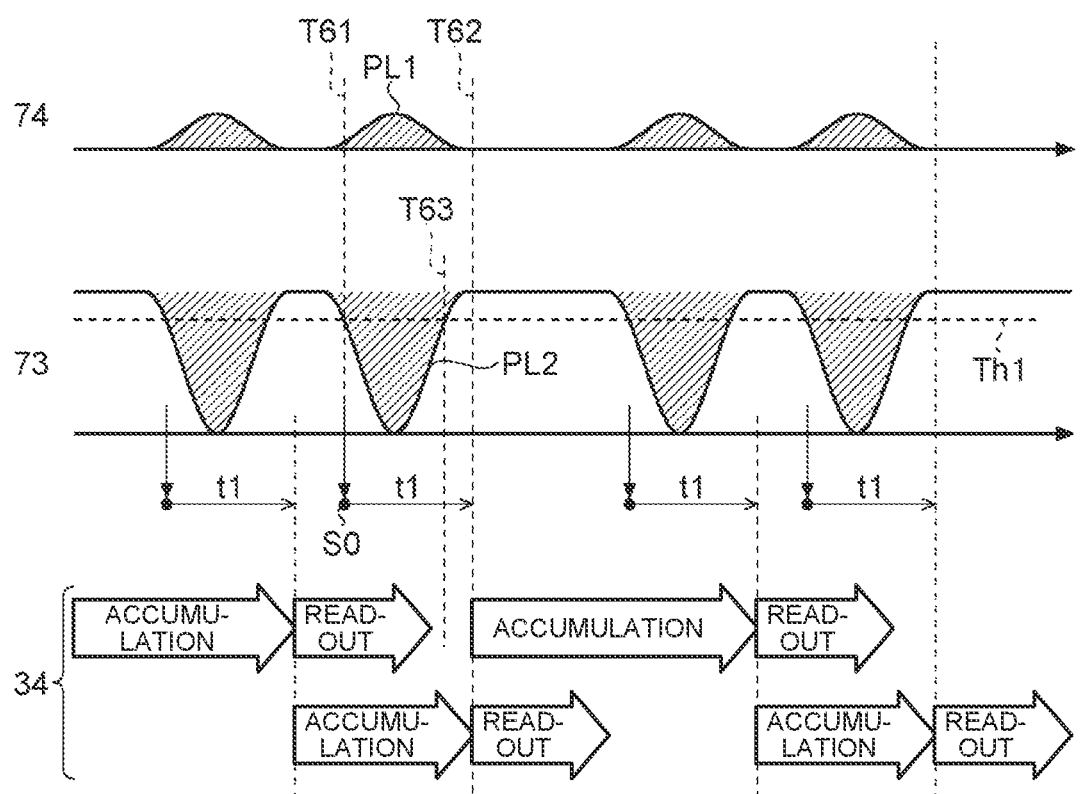
FIG. 8 is a timing chart for explaining an example of an operation of pulsed light detection in the flow cytometer according to the first embodiment.

Next, an example of an operation of pulsed light detection in the flow cytometer 11 according to the first embodiment will be described with reference to a timing chart of FIG. 8. FIG. 8 is a timing chart for explaining an example of an operation of pulsed light detection in the flow cytometer according to the first embodiment. Note that FIG. 8 exemplifies an operation when the specimen 53 passes through the irradiation spot 72A located on a most upstream side, in other words, an operation when pulsed light of the fluorescent ray 74A emitted from the irradiation spot 72A is detected. However, with respect to the fluorescent rays 74B to 74E emitted from the irradiation spots 72B to 72E on a downstream side, respectively, for example, a similar operation is executed at a predetermined time interval from a timing when passage of the specimen 53 through the irradiation spot 72A is detected on the basis of the forward scattered ray 73 (for example, timing T61 when an event signal S0 is generated), and pulsed light of each of the fluorescent rays 74B to 74E can be thereby detected. Note that the predetermined time interval may be equal to a time interval at which the same specimen 53 passes through the irradiation spots 72A to 72E.

The light intensity of the fluorescent ray 74A is drawn as a pulse waveform PL1 as illustrated at an uppermost part of FIG. 8 as the specimen 53 passes through the irradiation spot 72A, and each pulse waveform PL1 is a waveform corresponding to passage of one specimen 53. At this time, the light intensity of the forward scattered ray 73 detected by the photodiode 33 illustrated in a middle part of FIG. 8 is drawn as a pulse waveform PL2 having a similar timing to the pulse waveform PL1 in the upper part of FIG. 8 and a large intensity attenuation ratio.

At timing T61, the photodiode 33 acquires a passage timing of the specimen 53 from comparison between the intensity of the pulse waveform PL2 of the forward scattered ray and a threshold Th1, and generates the event signal S0.

Here, an end of the accumulation period and signal readout in the image sensor 34 are performed in synchronization with the event signal S0 indicating that the specimen 53 has passed. An access sequence of the readout is a global shutter having almost no dead period in accordance with FIG. 7.

That is, the start and the end of the accumulation period are performed simultaneously for all the pixels. At this time, in-pixel transfer of charges is performed in synchronization with the event signal S0 indicating passage of the specimen 53, and the accumulation period ends all at once for all the pixels. Then, readout of the pixel signal starts. Furthermore, at this time, a next accumulation period starts all at once for all the pixels.

At timing T62, the image sensor 34 ends the accumulation period in the pixel, starts readout of the pixel signal, and further starts a next accumulation period. Here, timing T62 is a timing after a certain delay time t1 in consideration of the flow velocity and the size of the specimen 53 elapses from timing T61 at which the event signal S0 is acquired.

The readout of the pixel signal is performed with acquisition of a difference between the AD conversion value of the accumulation signal and the AD conversion value of the reset signal that has already been acquired, and a net pixel signal in which kTC noise or the like is canceled out is thereby derived. Furthermore, subsequently, acquisition and AD conversion of the reset signal in a next cycle are performed, and when the acquisition and the AD conversion are completed, the next accumulation period ends, and readout can be performed. That is, the shortest cycle of an event process is equal to the shortest cycle of the unit accumulation period, which is determined by a time required for acquisition and AD conversion of each of the accumulation signal and the reset signal.

A total value of the net pixel signals output from the plurality of pixels 101 in each event process corresponds to the total amount of photons received by the photodetector for each pulse. As a result, the intensity of the fluorescent ray 74A for each specimen 53 is derived. That is, in the present embodiment, the pixel 101 accumulates photoelectrically converted charges therein, and incident light is thereby integrated in the pixel 101. Therefore, the AD conversion for output from each pixel 101 only needs to be performed once, and it is not necessary to perform the AD conversion a plurality of times in time series.

For example, assuming that a total time of 10 μs is required for the AD conversion of the reset signal, the AD conversion of the accumulation signal, and CDS thereof, a minimum interval of events that can be handled is about 10 μs, and up to 100,000 events in one second, that is, passage of the specimen 53 through the irradiation spot 72A can be evaluated.

Note that, in addition to the time for reading out the pixel signal from each pixel 101, a time for outputting the pixel signal that has been read out via the output circuit 96 is also required. However, for example, by disposing a register in the detection circuit 93 and temporarily storing the pixel signal therein, AD conversion of the reset signal and the accumulation signal and output of the pixel signal can be executed in parallel by a pipeline method, and therefore the time required for outputting the pixel signal does not restrict the accumulation cycle.

In addition, in this example, the event signal S0 indicating that the specimen 53 has passed is generated at downedge timing T61 when the pulse waveform PL2 falls below the threshold L1. However, the present disclosure is not limited thereto, and the event signal S0 may be generated at upedge timing T63 when the pulse waveform PL2 exceeds the threshold L1. When the event signal S0 is generated at upedge timing T63, it is easy to cope with a fluctuation in the size and flow rate of the specimen 53.

In addition, the event signal S0 may be generated using a detection result of the side scattered ray or the fluorescent ray 74A (dispersed ray 75A). In this case, light for event detection and light for specimen analysis may be spectrally dispersed, and the light for event detection may be incident on the photodiode 33.

Furthermore, instead of the photodiode 33, a light receiving element for event generation may be separately mounted in the image sensor 34.

Furthermore, the delay time t1 from the event signal S0 is fixed here, but in general, the intensity attenuation amount of the pulse waveform PL2 due to the forward scattered ray 73 is larger as the specimen 53 is larger. Therefore, the intensity of the pulse waveform PL2 may be evaluated, for example, by the beginning of the pulse, and the length of the delay time t1 may be set in accordance therewith. In this case, a longer delay time t1 may be set for a large specimen 53.

Figure 9:
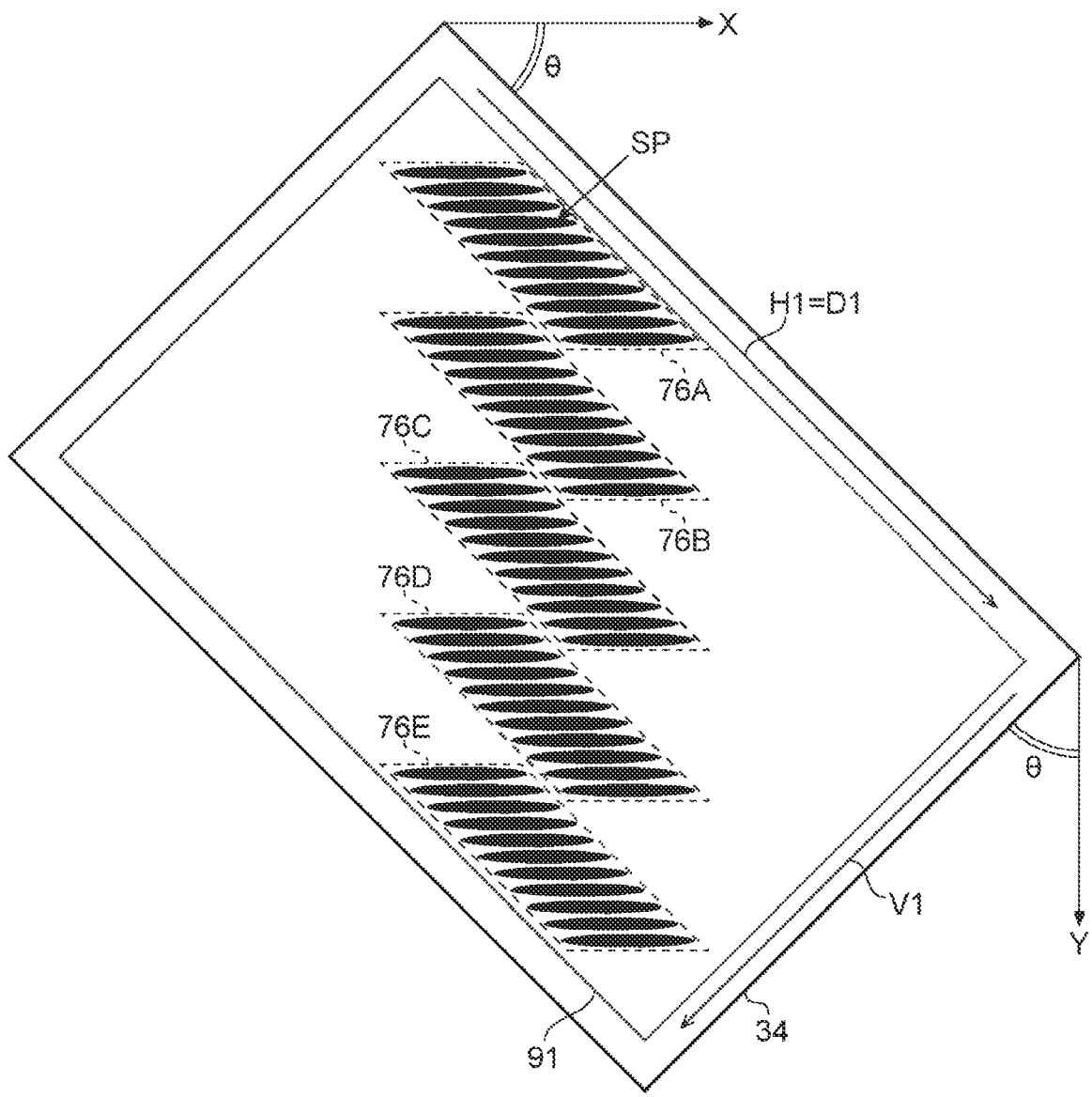
FIG. 9 is a diagram for explaining an example of a region on which a fluorescent ray (dispersed ray) is incident in the image sensor according to the first embodiment.

1.6 Example of Relationship Among Array Direction of Irradiation Spots, Spectral Direction, and Inclination of Image Sensor FIG. 9 is a diagram for explaining an example of a region on which a fluorescent ray (dispersed ray) is incident in the image sensor according to the first embodiment.

When the condenser lenses 36A to 36E and the spectroscopic optical systems 37A to 37E in a conjugate relationship are configured to cause the dispersed rays 75A to 75E to be incident on the image sensor 34 with the array of the irradiation spots 72A to 72E as it is, respectively, the fluorescence spots 76A to 76E formed by the dispersed rays 75A to 75E incident on the pixel array unit 91 of the image sensor 34 are arrayed in the Y direction as illustrated in FIG. 9.

Here, in each fluorescence spot 76, spread (beam cross-section) of light having the same wavelength has a shape in which the X direction is a longitudinal direction. Note that, in FIG. 9, for clarity, each fluorescent ray 74 is indicated as a set of rays having discrete wavelengths, and a spot SP formed by each of the rays having the wavelengths is indicated as an elliptical shape with a long axis in the X direction. However, actually, for example, when each fluorescent ray 74 is white light having a continuous and wide frequency spectrum, the fluorescence spot 76 formed by each fluorescent ray 74 has a shape spreading in a band shape.

Therefore, for example, when the spectral direction D1 of the fluorescent ray 74 by the spectroscopic optical system 37 is the X direction, spots SP of rays having different wavelengths overlap with each other, and wavelength resolution is reduced. As a result, accurate specimen analysis is difficult.

On the other hand, for example, when the spectral direction D1 of the fluorescent ray 74 by the spectroscopic optical system 37 is the Y direction, the fluorescence spots 76 of different fluorescent rays 74 overlap with each other, and accurate specimen analysis is difficult. In addition, suppressing spread of the dispersed ray 75 such that the fluorescence spots 76 of different fluorescent rays 74 do not overlap with each other means a decrease in wavelength resolution, leading to difficulty in accurate specimen analysis.

Therefore, in the present embodiment, as illustrated in FIG. 9, the spectral direction D1 of the spectroscopic optical system 37 is set so as to be inclined by an angle θ with respect to the Y direction which is an array direction of the irradiation spots 72A to 72E. This makes it possible to enhance the wavelength resolution while avoiding overlapping of the fluorescence spots 76 of the different fluorescent rays 74, and therefore more accurate specimen analysis is possible.

At this time, by setting a direction of an inclination of the row direction H1 of the pixel array unit 91 with respect to the X direction to the same direction as a direction of an inclination of the spectral direction D1 with respect to the X direction, the direction of spread of each fluorescence spot 76 and an outer edge of the pixel array unit 91 can be brought close to parallel, and therefore a necessary area of the pixel array unit 91 can be reduced.

Furthermore, by inclining the image sensor 34 such that the row direction H1 of the pixel array unit 91 coincides with or substantially coincides with the spectral direction D1, the direction of spread of each fluorescence spot 76 and the outer edge of the pixel array unit 91 are parallel, and therefore a necessary area of the pixel array unit 91 can be further reduced. In addition, in this configuration, since the direction of spread of each fluorescence spot 76 and the row direction H1 of the pixel array unit 91 coincide or substantially coincide with each other, complication of an evaluation process or the like executed by the signal acquisition system 1 on a spectral image of each fluorescence spot 76 can also be suppressed.

Note that an angle θ of the column direction V1 of the pixel array unit 91 with respect to the Y direction that is the array direction of the irradiation spots 72, in other words, the angle θ of the spectral direction D1 and the row direction H1 with respect to the X direction (for example, the horizontal direction) may be, for example, larger than 0° and smaller than 90°, and may be preferably in a range of about 30° or more and 60 or less.

Figure 10:
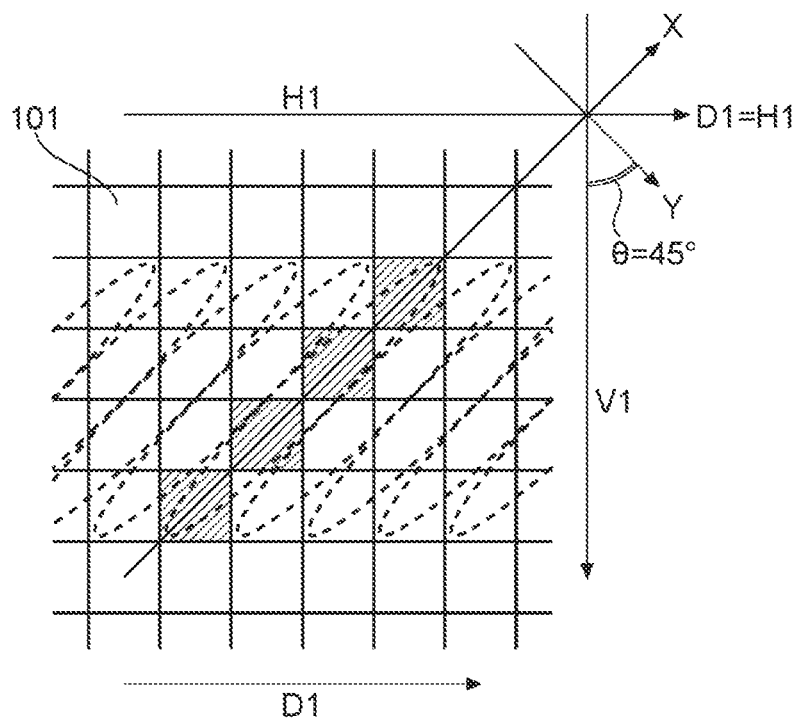
FIG. 10 is a diagram for explaining pixels constituting the same channel when an inclination in a row direction of a pixel array unit with respect to an array direction of irradiation spots is 45° in the first embodiment.

For example, when the angle θ is set to 45°, as in the pixel 101 indicated by hatching in FIG. 10, by adding pixel values read out from the pixels 101 arrayed in an oblique direction in a region on the pixel array unit 91 in which the fluorescence spots 76 are formed as pixel values of the same channel, the intensity of light having the same wavelength can be calculated. Note that the same channel may be a set of pixels 101 on which light having the same wavelength or a wavelength that can be regarded as the same is incident in each of regions 91A to 91E.

Figure 11:
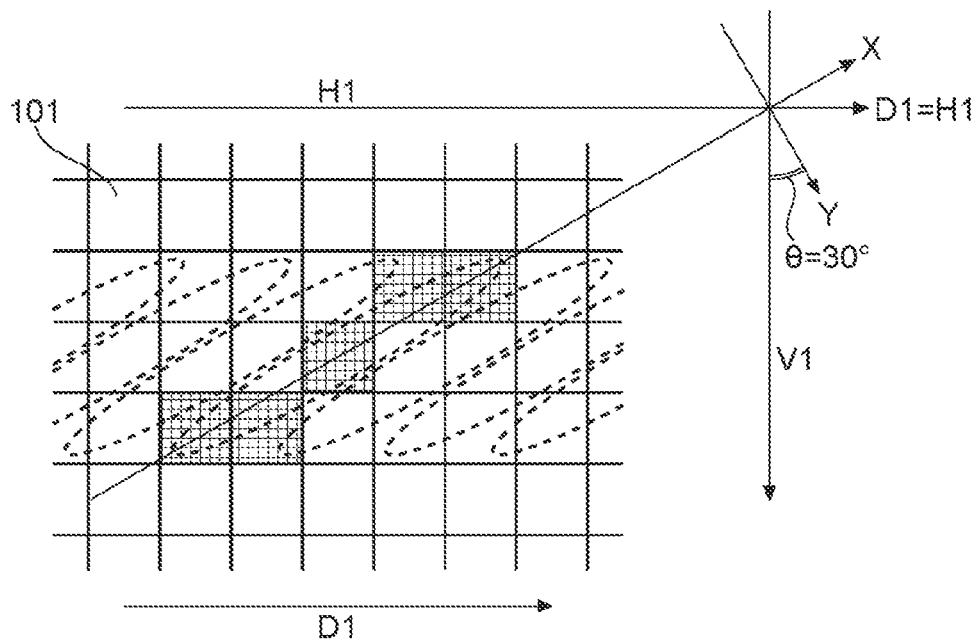
FIG. 11 is a diagram for explaining pixels constituting the same channel when the inclination in the row direction of the pixel array unit with respect to the array direction of the irradiation spots is 30° in the first embodiment.
Figure 12:
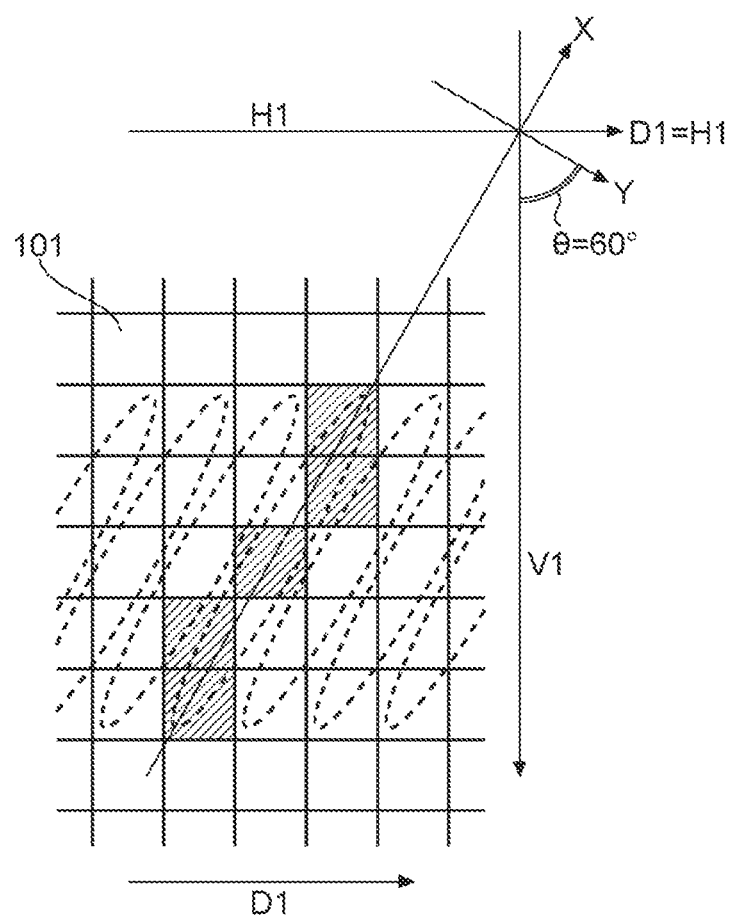
FIG. 12 is a diagram for explaining pixels constituting the same channel when the inclination in the row direction of the pixel array unit with respect to the array direction of the irradiation spots is 60° in the first embodiment.

In addition, when the angle θ is set to 30° or 60°, as in the pixel 101 indicated by hatching in FIG. 11 or 12, by adding pixel values read out from the pixels 101 on which light having the same wavelength is mainly incident in a region on the pixel array unit 91 in which the fluorescence spots 76 are formed as pixel values of the same channel, the intensity of light having the same wavelength can be calculated.

1.7 Action and Effect

As described above, according to the present embodiment, the spectral direction D1 of the spectroscopic optical system 37 is set so as to be inclined by the angle θ with respect to the Y direction which is an array direction of the irradiation spots 72A to 72E. This makes it possible to enhance the wavelength resolution while avoiding overlapping of the fluorescence spots 76 of the different fluorescent rays 74, and therefore more accurate specimen analysis is possible.

In addition, in the present embodiment, the image sensor 34 is inclined such that the row direction H1 of the pixel array unit 91 coincides or substantially coincides with the spectral direction D1. As a result, since the direction of spread of each fluorescence spot 76 and the outer edge of the pixel array unit 91 are parallel, a necessary area of the pixel array unit 91 can be reduced. In addition, since the direction of spread of each fluorescence spot 76 and the row direction H1 of the pixel array unit 91 coincide or substantially coincide with each other, complication of an evaluation process or the like executed by the signal acquisition system 1 on a spectral image of each fluorescence spot 76 can be suppressed.

Note that, in the first embodiment, the so-called global shutter method has been exemplified in which readout simultaneously starts for all the pixels 101 of the pixel array unit 91, but the present disclosure is not limited thereto. For example, when one detection circuit 93 is connected to a plurality of pixels 101 in the same column, a so-called rolling shutter method can be adopted in which pixel signals are sequentially read out from the pixels 101 connected to the same detection circuit 93. Note that, when the rolling shutter method is adopted, a selection transistor that controls connection between the drain of the amplification transistor 114 and the vertical signal line 124 according to a selection signal from the row drive circuit 121 is added to the drain of the amplification transistor 114 and the vertical signal line 124 in the pixel circuit of each pixel 101.

2. Second Embodiment

Next, an optical measuring device and an optical measuring system according to a second embodiment according to the second embodiment will be described in detail with reference to the drawings. Note that, in the following description, a configuration similar to that of the first embodiment is cited, and redundant description thereof will be thereby omitted.

As described with reference to FIG. 9 in the first embodiment, when the image sensor 34 is inclined such that the row direction H1 of the pixel array unit 91 coincides with or substantially coincides with the spectral direction D1, the direction of spread of each fluorescence spot 76 and the outer edge of the pixel array unit 91 are parallel.

Figure 13:
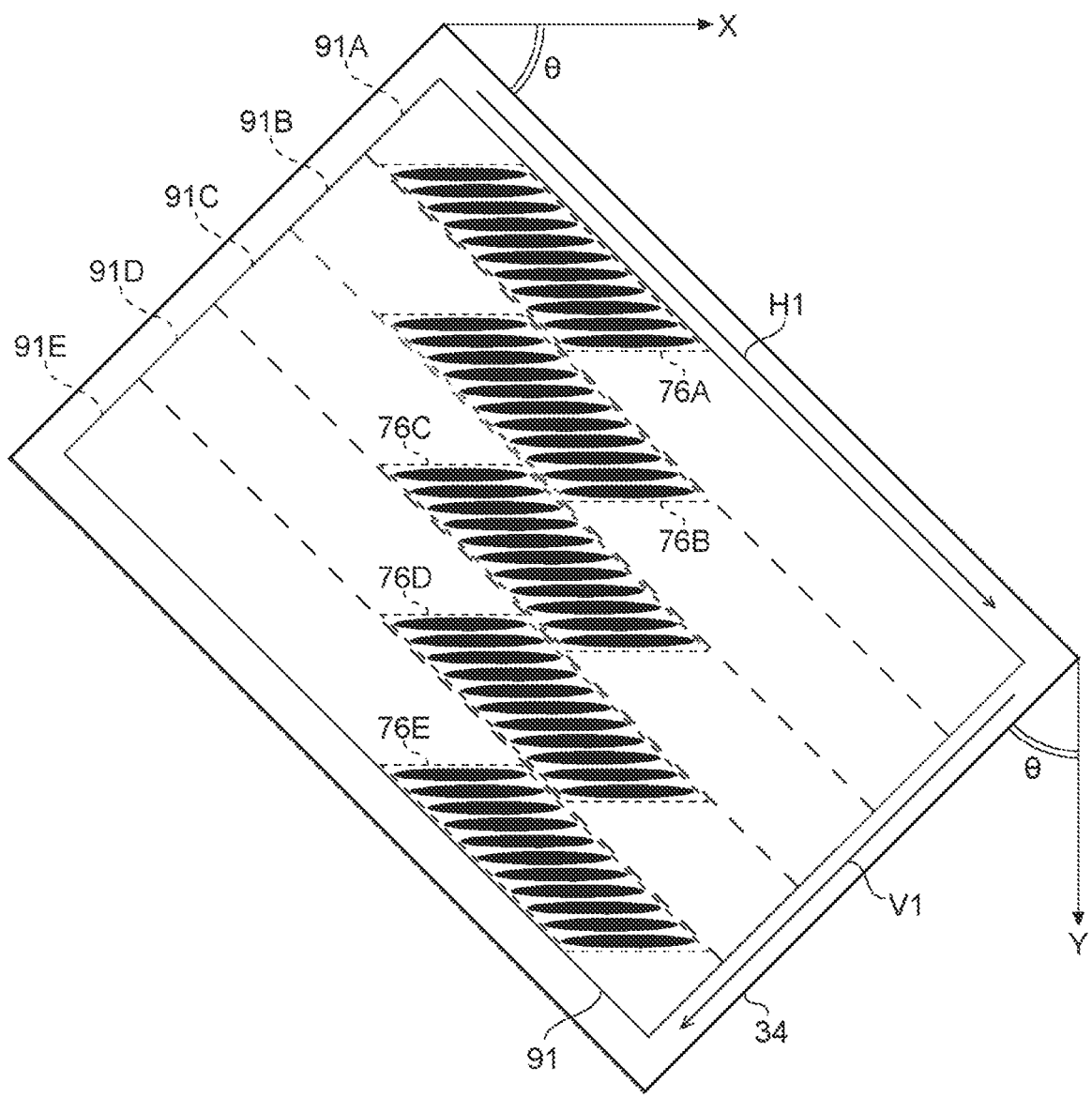
FIG. 13 is a diagram illustrating an example of area division of a pixel array unit according to a second embodiment.

Therefore, in the second embodiment, as illustrated in FIG. 13, a pixel array unit 91 is divided into a plurality of (five in this example) regions 91A to 91E in which fluorescence spots 76A to 76E are formed, respectively, and a spectral image of a fluorescent ray 74 is read out for each of the regions 91A to 91E.

At this time, by making readout by the global shutter method possible for each of the regions 91A to 91E, frame data read out in one read operation can be reduced. Therefore, a readout time at one time and a subsequent processing time for frame data can be largely reduced.

2.1 Example of Connection Relationship Between Pixel and Detection Circuit

Figure 14:
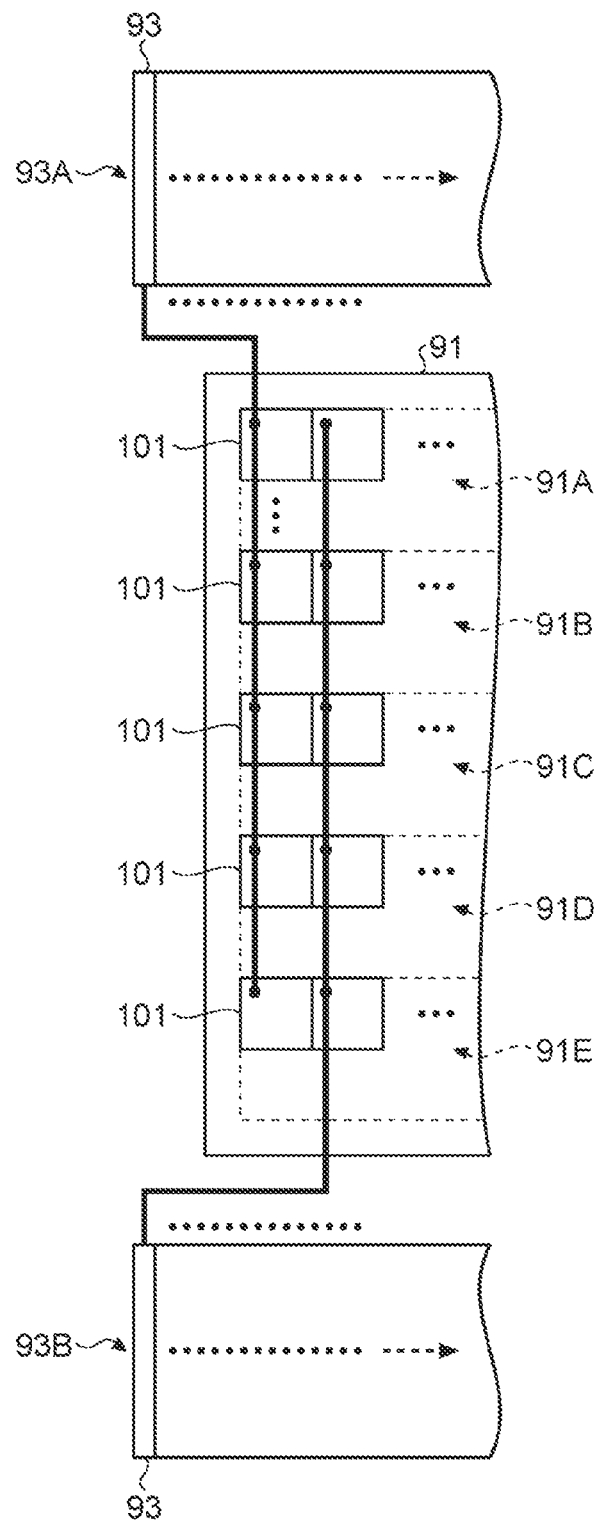
FIG. 14 is a diagram illustrating an example of a connection relationship between a pixel and a detection circuit according to the second embodiment.

FIG. 14 is a diagram illustrating an example of a connection relationship between a pixel and a detection circuit according to the second embodiment. As illustrated in FIG. 14, in the second embodiment, one detection circuit 93 is connected to one pixel 101 in each of the regions 91A to 91E. Therefore, as exemplified in FIG. 13, when the pixel array unit 91 is divided into five regions 91A to 91E arrayed in the column direction V1, one detection circuit 93 is connected to five pixels 101 that are not adjacent to each other in the same column.

As described above, when one detection circuit 93 is connected to one pixel 101 in each of the regions 91A to 91E, readout by the global shutter method is possible in each of the regions 91A to 91E, and readout by the rolling shutter method is possible in a unit of the regions 91A to 91E. As a result, a spectral image can be read out from one of the regions 9A1 to 91E by the global shutter method by one readout operation with respect to the pixel array unit 91.

2.2 Example of Circuit Configuration of Pixel

Figure 15:
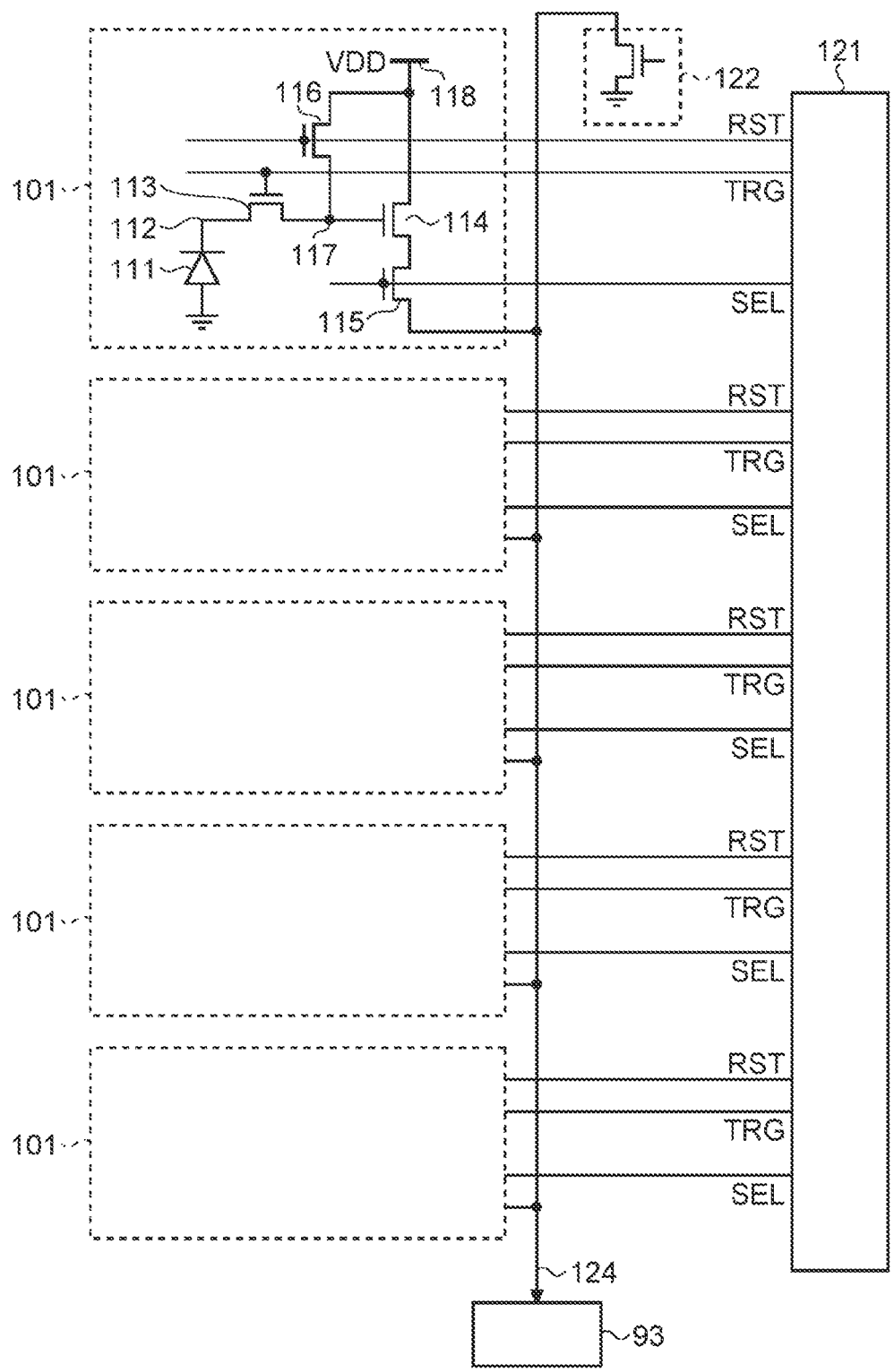
FIG. 15 is a circuit diagram illustrating an example of a circuit configuration of a pixel according to the second embodiment.

Next, an example of a circuit configuration of the pixel 101 according to the second embodiment will be described with reference to FIG. 15. FIG. 15 is a circuit diagram illustrating an example of a circuit configuration of a pixel according to the second embodiment.

As illustrated in FIG. 15, each pixel 101 according to the second embodiment has a configuration in which a selection transistor 115 is added to a configuration similar to the circuit configuration described with reference to FIG. 5 in the first embodiment. A gate of the selection transistor 115 is connected to a selection drive line to which a selection signal SEL is supplied from a row drive circuit 121, a source of the selection transistor 115 is connected to a drain of an amplification transistor 114, and a drain of the selection transistor 115 is connected to a vertical signal line 124.

In addition, one pixel 101 in each of the regions 91A to 91E is connected to one vertical signal line 124.

2.3 Example of Basic Operation of Pixel

Figure 16:
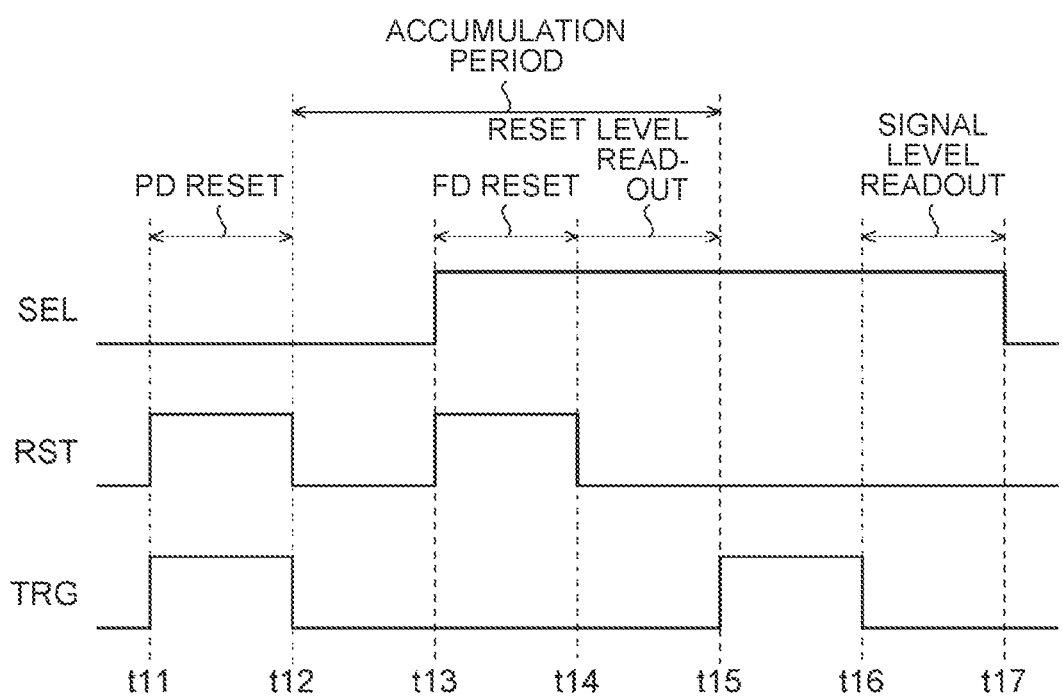
FIG. 16 is a timing chart illustrating an example of an operation of the pixel according to the second embodiment.

Next, an example of a basic operation of the pixel 101 according to the second embodiment will be described with reference to a timing chart of FIG. 16. FIG. 16 is a timing chart illustrating an example of an operation of a pixel according to the second embodiment.

As illustrated in FIG. 16, in an operation of reading out a pixel signal from each pixel 101, first, a reset signal RST supplied from the row drive circuit 121 to the gate of the reset transistor 116 and a transfer signal TRG supplied from the row drive circuit 121 to the gate of the transfer transistor 113 are set to a high level in a period of timings t11 to t12. As a result, an accumulation node 112 corresponding to a cathode of the photodiode 111 is connected to a power supply 118 via the transfer transistor 113 and the reset transistor 116, and charges accumulated in the accumulation node 112 are discharged (reset). In the following description, this period (t11 to t12) is referred to as photodiode (PD) reset.

At this time, since a floating diffusion 117 is also connected to the power supply 118 via the transfer transistor 113 and the reset transistor 116, charges accumulated in the floating diffusion 117 are also discharged (reset).

The reset signal RST and the transfer signal TRG fall to a low level at timing t12. Therefore, a period from timing t12 till timing t15 at which the transfer signal TRG next rises is an accumulation period in which a charge generated in the photodiode 111 is accumulated in the accumulation node 112.

Next, during a period of timings t13 to t17, the selection signal SEL applied from the row drive circuit 121 to the gate of the selection transistor 125 is set to a high level. As a result, a pixel signal can be read out from the pixel 101 in which the selection signal SEL is set to a high level.

In addition, during the period of timings t13 to t14, the reset signal RST is set to a high level. As a result, the floating diffusion 117 is connected to the power supply 118 via the transfer transistor 113 and the reset transistor 116, and charges accumulated in the floating diffusion 117 are discharged (reset). In the following description, this period (t13 to t14) is referred to as FD reset.

After the FD reset, a voltage in a state where the floating diffusion 117 is reset, that is, in a state where a voltage applied to the gate of the amplification transistor 114 is reset (hereinafter, referred to as a reset level) appears in the vertical signal line 124. Therefore, in the present operation, for the purpose of noise removal by correlated double sampling (CDS), by driving the detection circuit 93 during a period of timings t14 to t15 when the reset level appears in the vertical signal line 124, a pixel signal at the reset level is read out and converted into a digital value. Note that, in the following description, readout of the pixel signal at the reset level is referred to as reset sampling.

Next, during a period of timings t15 to t16, the transfer signal TRG supplied from the row drive circuit 121 to the gate of the transfer transistor 113 is set to a high level. As a result, charges accumulated in the accumulation node 112 during the accumulation period are transferred to the floating diffusion 117. As a result, a voltage having a voltage value corresponding to the amount of charges accumulated in the floating diffusion 117 (hereinafter, referred to as a signal level) appears in the vertical signal line 124. Not that, in the following description, the transfer of the charges accumulated in the accumulation node 112 to the floating diffusion 117 is referred to as data transfer.

As described above, when the signal level appears in the vertical signal line 124, by driving the detection circuit 93 during a period of timings t16 to t17, a pixel signal at the signal level is read out and converted into a digital value. Then, by executing a CDS process of subtracting the pixel signal at the reset level converted into a digital value from the pixel signal at the signal level similarly converted into a digital value, a pixel signal of a signal component corresponding to an exposure amount to the photodiode 111 is output from the detection circuit 93. Note that, in the following description, readout of the pixel signal at the signal level is referred to as data sampling.

2.4 Example of Schematic Operation of Flow Cytometer

Next, a schematic operation of a flow cytometer according to the second embodiment will be described with an example. FIG. 17 is a timing chart illustrating an example of a schematic operation of the multispot type flow cytometer according to the second embodiment.

Note that, in the timing chart illustrated in FIG. 17, a detection signal of the forward scattered ray 73 or the like output from the photodiode 33 or the like (hereinafter, referred to as a PD detection signal) is indicated at an uppermost part, an example of a trigger signal generated on the basis of the PD detection signal is indicated at a next highest part, examples of fluorescent rays 7474A to 74E (actually, dispersed rays 75A to 75E of the fluorescent rays 74A to 74E) incident on the regions 91A to 91E of the pixel array unit 91, respectively, are indicated at a next highest part, and a drive example of the image sensor 34 or a drive example of each of the regions 91A to 91D of the image sensor 34 is indicated at a lowermost part.

In addition, in the present description, a case where the irradiation spots 72A to 72E are arranged at equal intervals along the sample flow 52, and a time interval until the specimen 53 that has passed through an irradiation spot on an upstream side passes through a next irradiation spot is 16 µs will be exemplified.

As illustrated in FIG. 17, in the flow cytometer 11, a reset signal S1 (corresponding to the above-described reset signal RST and transfer signal TRG) that resets the photodiode 111 of the image sensor 34 is output at a predetermined cycle (for example, 10 to 100 µs (microseconds)) during a period in which the forward scattered ray 73 is not detected by the photodiode 33. That is, during the period in which the forward scattered ray 73 is not detected by the photodiode 33, the PD reset for each pixel 101 is periodically executed.

Thereafter, when the light amount of the forward scattered ray 73 incident on the photodiode 33 decreases due to passage of the specimen 53 through the irradiation spot 72A, the photodiode 33 generates an on-edge trigger signal D0 at a timing when a PD detection signal P0 falls below a predetermined threshold Vt, and inputs the on-edge trigger signal D0 to the image sensor 34.

The image sensor 34 to which the on-edge trigger signal D0 is input stops periodic supply of the reset signal S1 to the pixel 101, and in this state, waits until the PD detection signal P0 detected by the photodiode 33 exceeds the predetermined threshold Vt. When the supply of the reset signal S1 immediately before the stop is completed, a charge accumulation period starts in each pixel 101 of the image sensor 34. Note that the threshold Vt may be the same as or different from the threshold Vt for generating the on-edge trigger signal D0.

Thereafter, the photodiode 33 generates an off-edge trigger signal U0 at a timing when the PD detection signal P0 exceeds the predetermined threshold Vt, and inputs the off-edge trigger signal U0 to the image sensor 34.

In addition, while the specimen 53 is passing through the irradiation spot 72A, the dispersed ray 75A of the fluorescent ray 74A emitted from the specimen 53 passing through the irradiation spot 72A is incident on the region 91A of the image sensor 34 as a pulse P1 together with the decrease in the light amount of the forward scattered ray 73. Here, in the image sensor 34, as described above, when the on-edge trigger signal D0 preceding the off-edge trigger signal U0 is input to the image sensor 34, the supply of the reset signal S1 is stopped, and the accumulation period starts. Therefore, while the specimen 53 is passing through the irradiation spot 72A, charges corresponding to the light amount of the pulse P1 are accumulated in the accumulation node 112 of each pixel 101 in the region 91A.

When the off-edge trigger signal U0 is input to the image sensor 34, the image sensor 34 first sequentially executes FD reset S11, the reset sampling S12, data transfer S13, and data sampling S14 for each pixel 101 in the region 91A. As a result, a spectral image of the dispersed ray 75A (that is, fluorescent ray 74A) is read out from the region 91A. Hereinafter, a series of operations from the FD reset to the data sampling is referred to as a readout operation.

In addition, the dispersed rays 75B to 75E are incident on the regions 91B to 91E of the image sensor 34 as pulses P2 to P5 in accordance with passage of the specimen 53 through the irradiation spots 72B to 72E, respectively. Here, according to the assumption described above, a time interval at which the same specimen 53 passes through the irradiation spots 72A to 72E is 16 µs.

Therefore, the image sensor 34 executes a readout operation (FD reset S21 to data sampling S24) on the pixel 101 in the region 91B 16 µs after the timing when the FD reset S11 starts for the pixel 101 in the region 91A.

Similarly, the image sensor 34 executes a readout operation (FD reset S31 to data sampling S34) on the pixel 101 in the region 91C 16 µs after the timing when the FD reset S21 starts for the pixel 101 in the region 91B, further executes a readout operation (FD reset S41 to data sampling S44) on the pixel 101 in the region 91D 16 µs after the timing when the FD reset S31 starts for the pixel 101 in the region 91C, and further executes a readout operation (FD reset S51 to data sampling S54) on the pixel 101 in the region 91E 16 µs after the timing when the FD reset S41 starts for the pixel 101 in the region 91D.

By the above operation, the spectral images of the fluorescent rays 74B to 74E are read out from the regions 91A to 91E at intervals of 16 µs, respectively.

Then, when the readout of the spectral image from the region 91E is completed and the on-edge trigger signal D0 due to passage of a next specimen 53 is not input, the image sensor 34 supplies the reset signal S1 again and executes periodic PD reset. Meanwhile, when the on-edge trigger signal D0 due to passage of the next specimen 53 is input before the readout of the spectral image from the region 91E is completed, the image sensor 34 executes operations similar to those described above, and thereby reads out the spectral images of the fluorescent rays 74A to 74E from the regions 91A to 91E at intervals of 16 µs, respectively.

2.5 Action and Effect

As described above, in the present embodiment, the pixel array unit 91 is divided into the plurality of (five in the present example) regions 91A to 91E in which the fluorescence spots 76A to 76E are formed, respectively, and readout by the global shutter method for each of the regions 91A to 91E is possible. Therefore, frame data read out in one readout operation can be reduced. As a result, a readout time at one time and a subsequent processing time for frame data can be largely reduced.

Other configurations, operations, and effects may be similar to those of the above-described embodiment or modifications thereof, and therefore detailed description thereof is omitted here.

Although the embodiments of the present disclosure have been described above, the technical scope of the present disclosure is not limited to the above-described embodiments as they are, and various modifications can be made without departing from the gist of the present disclosure. In addition, components of different embodiments and modifications may be appropriately combined with each other.

In addition, the effects of the embodiments described here are merely examples and are not limited, and other effects may be provided.

Note that the present technology can also have the following configurations.

(1)

An optical measuring device comprising:
a spectroscopic optical system that spectrally disperses a fluorescent ray emitted from a specimen that passes through each of a plurality of irradiation spots arrayed in a first direction in a second direction included in a plane parallel to the first direction; and
an image sensor that receives the fluorescent ray spectrally dispersed by the spectroscopic optical system and generates image data, wherein
the second direction is inclined with respect to a plane vertical to the first direction.

(2)

The optical measuring device according to (1), wherein an inclination of the second direction with respect to the plane vertical to the first direction is 30° or more and 60° or less.

(3)

The optical measuring device according to (1) or (2), wherein
the image sensor includes a plurality of pixels arrayed in a matrix, and
a row direction in the array of the plurality of pixels is inclined with respect to the plane vertical to the first direction.

(4)

The optical measuring device according to (3), wherein a direction in which the row direction is inclined with respect to the plane vertical to the first direction is the same as a direction in which the second direction is inclined with respect to the plane vertical to the first direction.

(5)

The optical measuring device according to (4), wherein an inclination of the row direction with respect to the plane vertical to the first direction is the same as an inclination of the second direction with respect to the plane vertical to the first direction.

(6)

The optical measuring device according to any one of (1) to (5), further comprising a plurality of excitation light sources that irradiates the irradiation spots with an excitation ray having a predetermined wavelength, respectively.

(7)

The optical measuring device according to (6), further comprising a flow path through which the specimen moves in the first direction, wherein
the plurality of irradiation spots is set on the flow path.

(8)

The optical measuring device according to (1), wherein the image sensor includes:
a pixel array unit including a plurality of pixels arrayed in a matrix; and
a plurality of detection circuits connected to the plurality of pixels on a one-to-one basis.

(9)

The optical measuring device according to (8), wherein the image sensor includes:
a pixel array unit including a plurality of pixels arrayed in a matrix; and
a plurality of detection circuits connected to two or more pixels in the same column in the plurality of pixels, wherein
the pixel array unit is divided into a plurality of regions arrayed in a column direction of the matrix, and
the detection circuits are connected to the pixels on a one-to-one basis in each of the plurality of regions.

(10)

An optical measuring system including:
a spectroscopic optical system that spectrally disperses a fluorescent ray emitted from a specimen that passes through each of a plurality of irradiation spots arrayed in a first direction in a second direction;
an image sensor that receives the fluorescent ray spectrally dispersed by the spectroscopic optical system and generates image data;
a signal acquisition unit that evaluates the image data generated by the image sensor; and
an analysis unit that analyzes the specimen on a basis of an evaluation result of the image data by the signal acquisition unit, wherein
the second direction is inclined with respect to a plane vertical to the first direction.

REFERENCE SIGNS LIST

1 SIGNAL ACQUISITION SYSTEM
2 ANALYSIS SYSTEM
11 FLOW CYTOMETER
31 FLOW CELL
32A to 32E EXCITATION LIGHT SOURCE
33 PHOTODIODE
34 IMAGE SENSOR
35, 36A to 36E CONDENSER LENS
37A to 37E SPECTROSCOPIC OPTICAL SYSTEM
371 OPTICAL ELEMENT
51 SAMPLE TUBE
52 SAMPLE FLOW
53 SPECIMEN
71A to 71E EXCITATION RAY
72A to 72E IRRADIATION SPOT
73 FORWARD SCATTERED RAY
74A to 74E FLUORESCENT RAY
75A to 75E DISPERSED RAY
76A to 76E FLUORESCENCE SPOT
91 PIXEL ARRAY UNIT
92 CONNECTION UNIT
93 DETECTION CIRCUIT
93A, 93B DETECTION CIRCUIT ARRAY
94 PIXEL DRIVE CIRCUIT
95 LOGIC CIRCUIT
96 OUTPUT CIRCUIT
101 PIXEL
111 PHOTODIODE
112 ACCUMULATION NODE
113 TRANSFER TRANSISTOR
114 AMPLIFICATION TRANSISTOR
115 SELECTION TRANSISTOR
116 RESET TRANSISTOR
117 FLOATING DIFFUSION
118 POWER SUPPLY
121 ROW DRIVE CIRCUIT
122 CONSTANT CURRENT CIRCUIT
124 VERTICAL SIGNAL LINE

The invention claimed is:

1. An optical measuring device, comprising:
a plurality of pixels arrayed in a matrix; and
circuitry configured to:
spectrally disperse a fluorescent ray emitted from a specimen, wherein the specimen passes through each of a plurality of irradiation spots arrayed in a first direction, the fluorescent ray is spectrally dispersed in a second direction, the first direction is y-direction and the second direction is z-direction, and the second direction is included in a first plane which is parallel to the first direction;

receive the spectrally dispersed fluorescent ray; and generate image data, wherein the second direction is inclined with respect to a second plane which is vertical to the first direction, and a row direction in the arrayed plurality of pixels is inclined with respect to the second plane which is vertical to the first direction.

2. The optical measuring device according to claim 1, wherein an inclination of the second direction with respect to the second plane which is vertical to the first direction is 30° or more and 60° or less.

3. The optical measuring device according to claim 1, wherein a direction in which the row direction is inclined with respect to the second plane which is vertical to the first direction is same as a direction in which the second direction is inclined with respect to the second plane which is vertical to the first direction.

4. The optical measuring device according to claim 3, wherein an inclination of the row direction with respect to the second plane which is vertical to the first direction is same as an inclination of the second direction with respect to the second plane which is vertical to the first direction.

5. The optical measuring device according to claim 1, further comprising a plurality of excitation light sources that irradiates the plurality of irradiation spots with an excitation ray having a specific wavelength, respectively.

6. The optical measuring device according to claim 5, further comprising a flow path through which the specimen moves in the first direction, wherein the plurality of irradiation spots is set on the flow path.

7. The optical measuring device according to claim 1, further includes a plurality of detection circuits connected to the plurality of pixels on a one-to-one basis.

8. The optical measuring device according to claim 1, wherein the further image sensor includes:

a pixel array unit including the plurality of pixels arrayed in the matrix; and a plurality of detection circuits connected to at least two pixels in same column in the plurality of pixels, wherein the pixel array unit is divided into a plurality of regions arrayed in a column direction of the matrix, and the plurality of detection circuits is connected to the plurality of pixels on a one-to-one basis in each of the plurality of regions.

9. An optical measuring system, comprising:

a plurality of pixels arrayed in a matrix; and circuitry configured to:

spectrally disperse a fluorescent ray emitted from a specimen, wherein the specimen passes through each of a plurality of irradiation spots arrayed in a first direction, the fluorescent ray is spectrally dispersed in a second direction, the first direction is y-direction and the second direction is z-direction, and the second direction is included in a first plane which is parallel to the first direction;

receive the spectrally dispersed fluorescent ray;

generate image data;

evaluate the generated image data; and analyze the specimen based on an evaluation result of the image data, wherein the second direction is inclined with respect to a second plane which is vertical to the first direction, and a row direction in the arrayed plurality of pixels is inclined with respect to the second plane which is vertical to the first direction.

* * * * *